(12) United States Patent
Oka et al.

(10) Patent No.: US 7,589,314 B2
(45) Date of Patent: Sep. 15, 2009

(54) OPTICAL ENCODER APPLYING SUBSTANTIALLY PARALLEL LIGHT BEAMS AND THREE PERIODIC OPTICAL ELEMENTS

(75) Inventors: Toru Oka, Tokyo (JP); Yoichi Ohmura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 118 days.

(21) Appl. No.: 11/571,617

(22) PCT Filed: Jun. 17, 2005

(86) PCT No.: PCT/JP2005/011151

§ 371 (c)(1),
(2), (4) Date: Jan. 4, 2007

(87) PCT Pub. No.: WO2006/006342

PCT Pub. Date: Jan. 19, 2006

(65) Prior Publication Data

US 2008/0048104 A1    Feb. 28, 2008

(30) Foreign Application Priority Data

Jul. 12, 2004    (JP) .............................. 2004-204552

(51) Int. Cl.
*G01D 5/34*    (2006.01)

(52) U.S. Cl. .................. 250/231.13; 359/440; 359/441; 359/442

(58) Field of Classification Search ................. 250/231.13–231.18, 237 R, 237 G; 33/1 PT, 33/1 N; 356/616–619; 359/436–442

See application file for complete search history.

(56) References Cited

U.S. PATENT DOCUMENTS

| 4,943,716 A | 7/1990 | Ichikawa et al. |
| 4,959,542 A | 9/1990 | Stephens |
| 6,703,602 B1 * | 3/2004 | Hao ...................... 250/231.18 |
| 2004/0090637 A1 * | 5/2004 | Holzapfel et al. ........... 356/499 |
| 2007/0187581 A1 * | 8/2007 | Ohmura et al. ......... 250/231.13 |

FOREIGN PATENT DOCUMENTS

| CN | 1014935 B | 11/1991 |
| JP | 63 153 408 | 6/1988 |
| JP | 2 24318 | 2/1990 |
| JP | 7 98207 | 4/1995 |

(Continued)

OTHER PUBLICATIONS

K. Hane, et al. "Imaging With Rectangular Transmission Gratings", Optical Society of America, vol. 4, No. 4, Apr. 1987, pp. 706-711.

*Primary Examiner*—Thanh X Luu
*Assistant Examiner*—Francis M Legasse, Jr.
(74) *Attorney, Agent, or Firm*—Oblon, Spivak, McClelland, Maier & Neustadt, L.L.P.

(57) ABSTRACT

An optical encoder for measuring a relative movement of a first scale plate and a second scale plate, comprises: a light source; a first scale plate which converts light from the light source into a cyclic light quantity distribution; a second scale plate which cyclically makes spatial modulation on the light beams from the first scale plate; a third scale plate having slits which allow the light beams from the second scale plate to pass therethrough; and a light-receiving element which receives the light beams from the third scale plate; a lens which converts light from the light source into substantially parallel light beams; and an optic array which converges or diffuses light beams in the direction of periodic change and generates a cyclic light quantity distribution on the first scale plate.

16 Claims, 24 Drawing Sheets

FOREIGN PATENT DOCUMENTS

| | | |
|---|---|---|
| JP | 8 201114 | 8/1996 |
| JP | 9 138143 | 5/1997 |
| JP | 10 2761 | 1/1998 |
| JP | 11 14404 | 1/1999 |

* cited by examiner

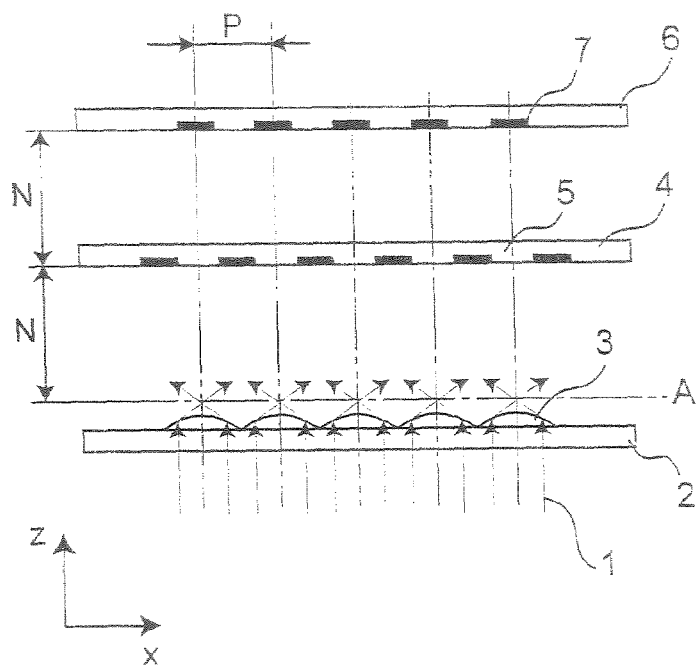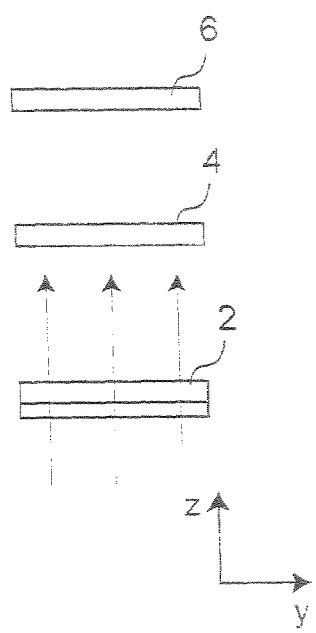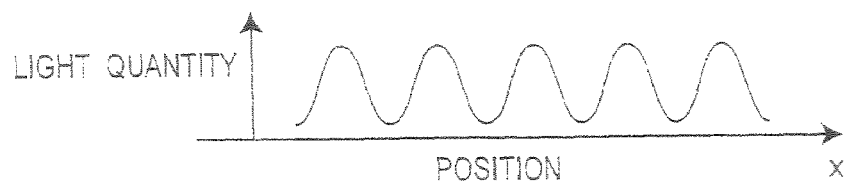

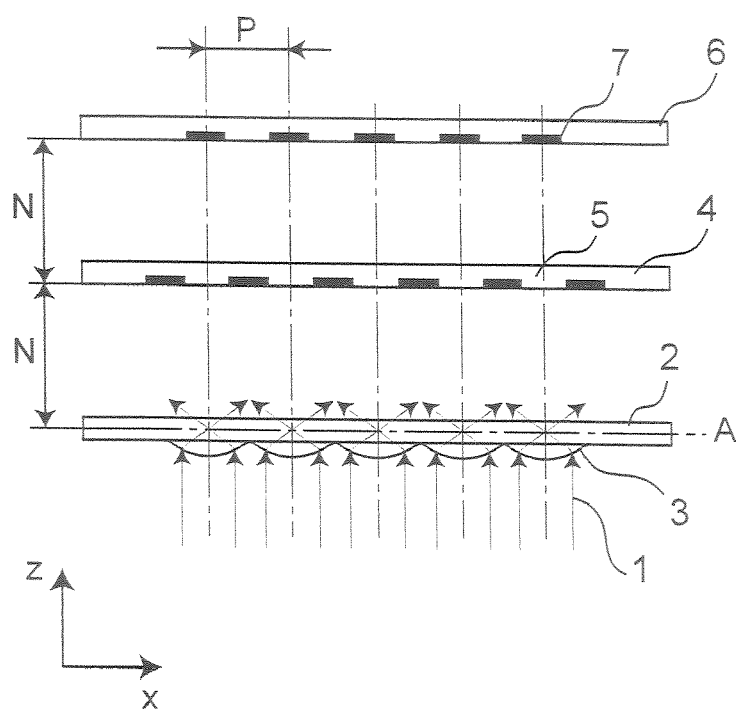 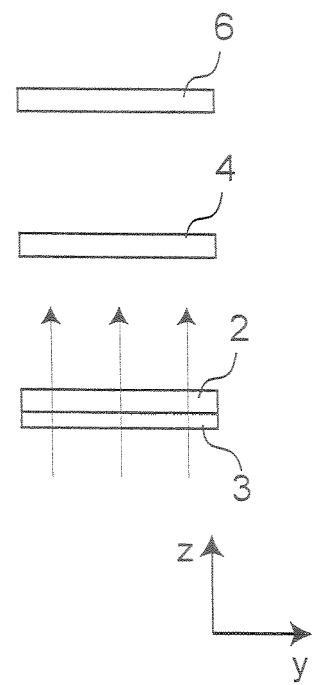

Fig.3A
Fig.3B
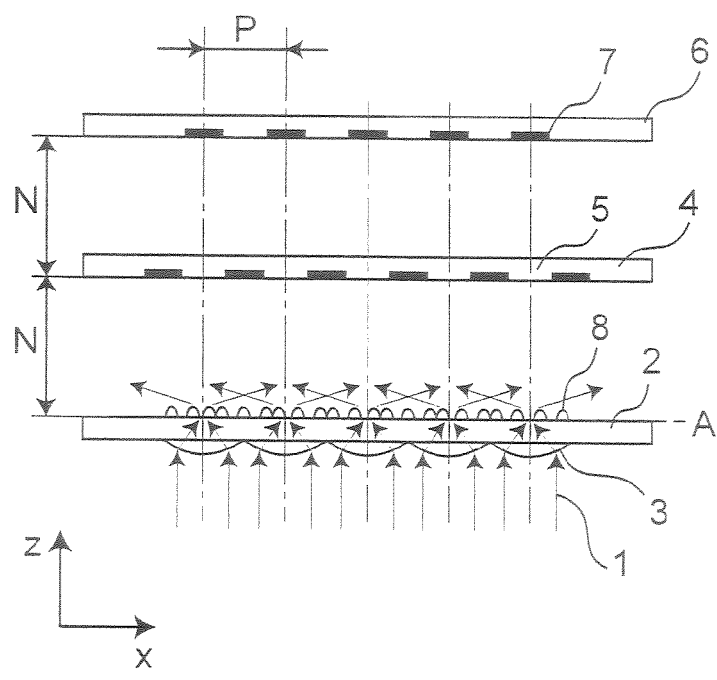
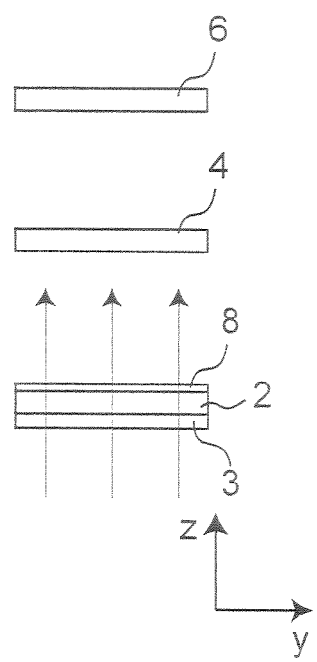

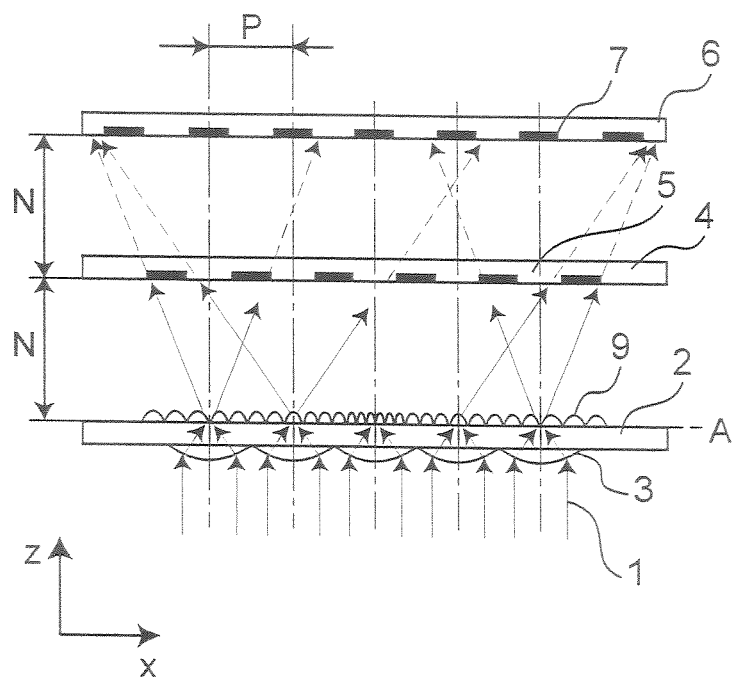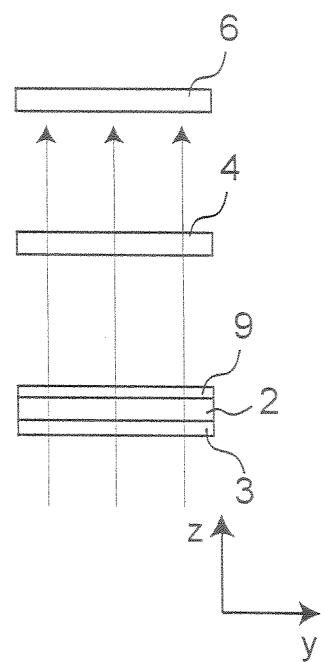

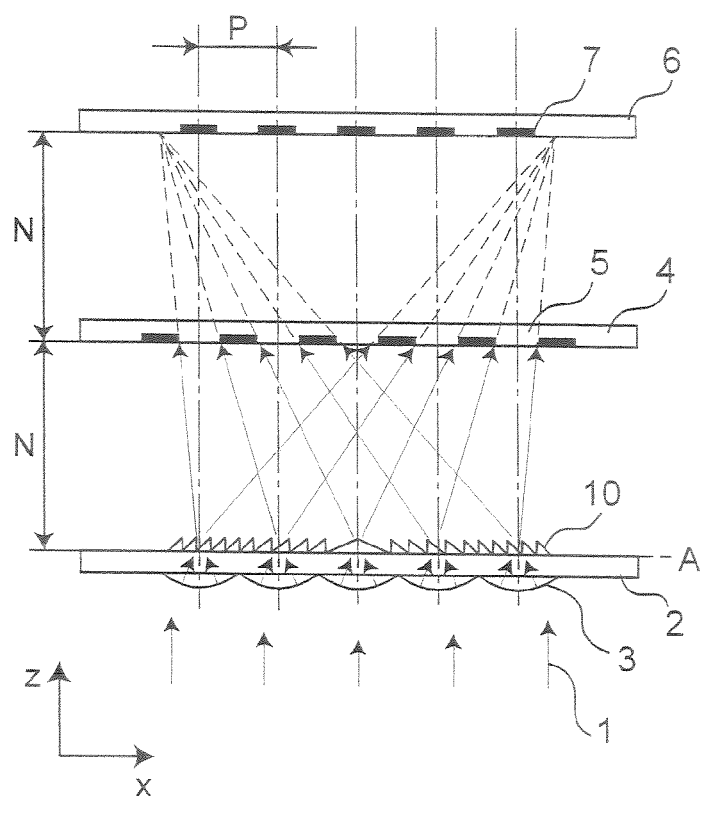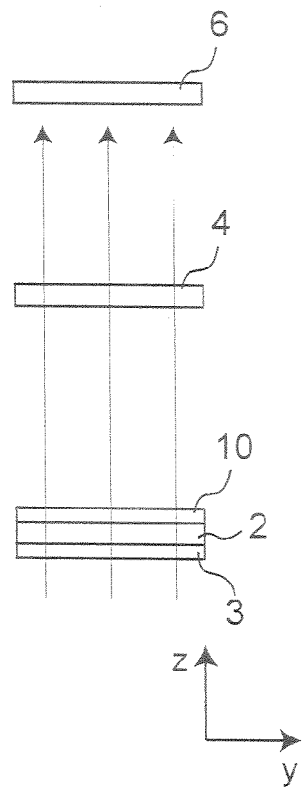

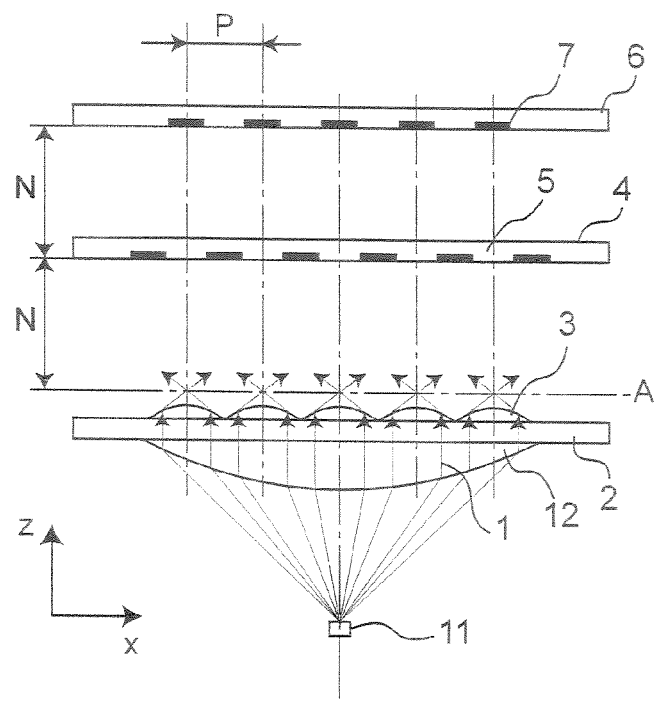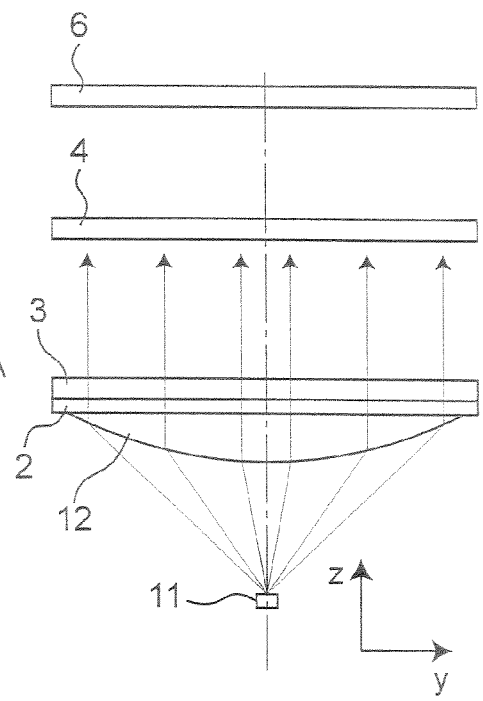

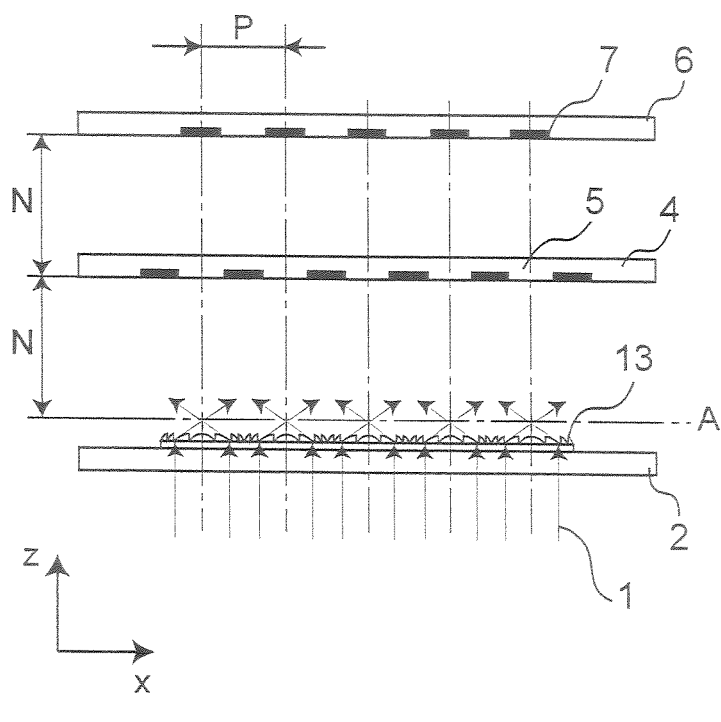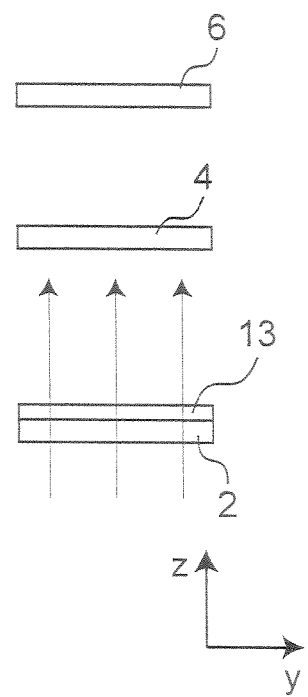

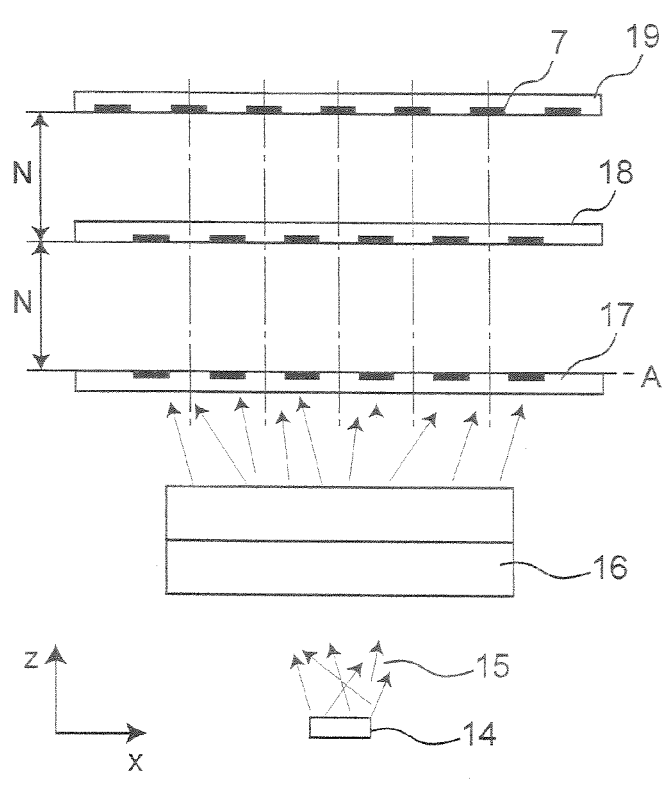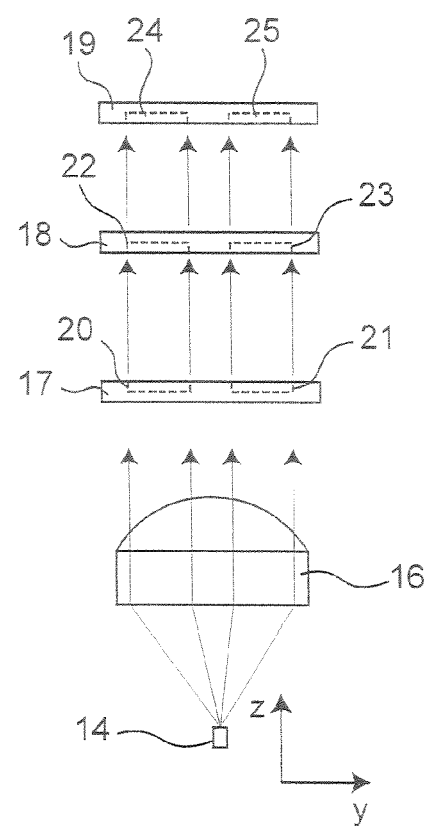

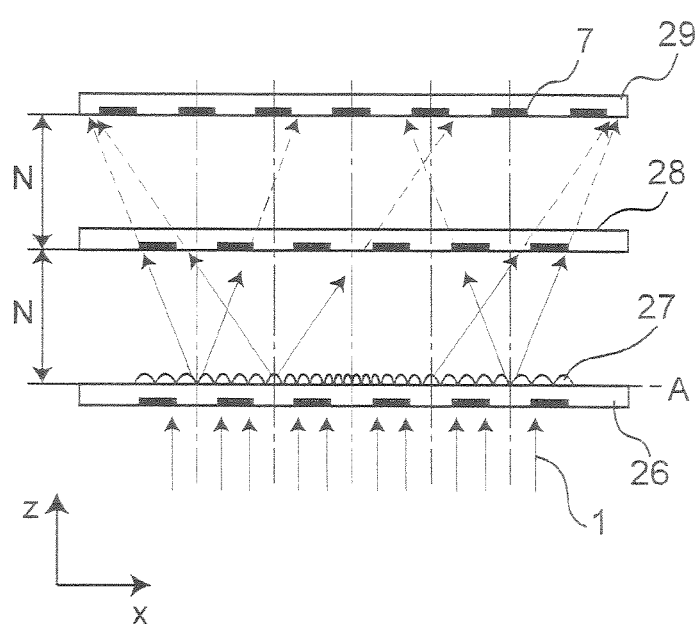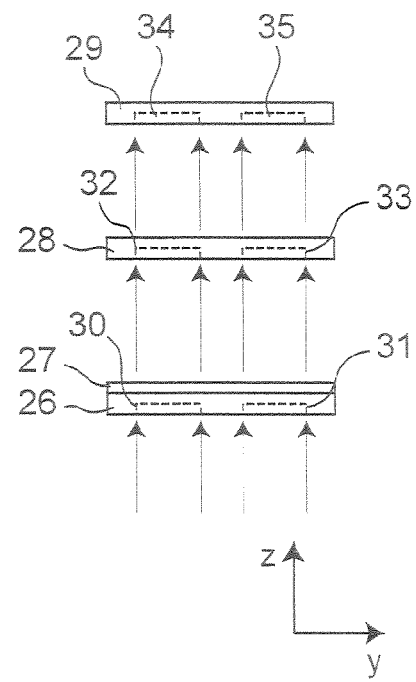

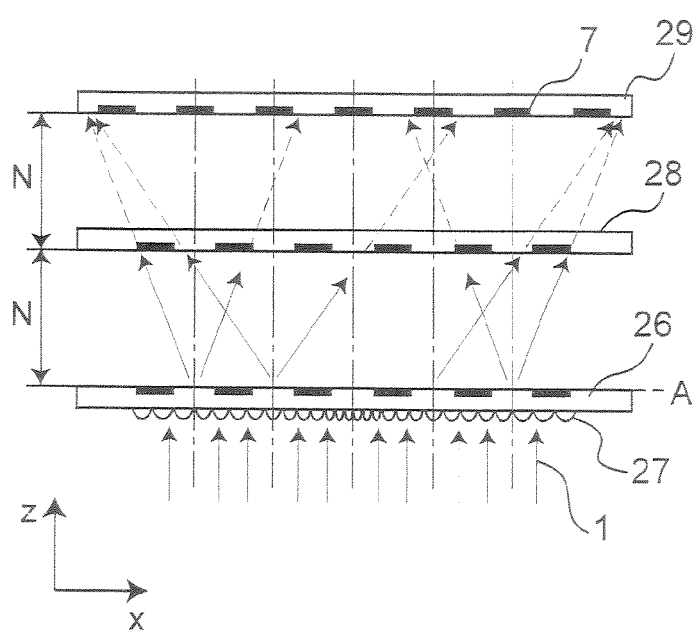
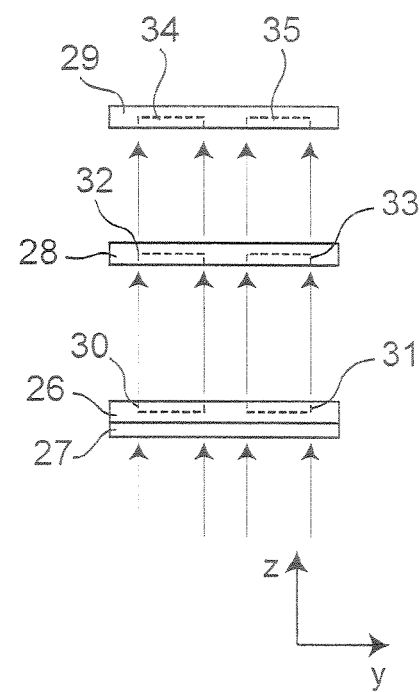

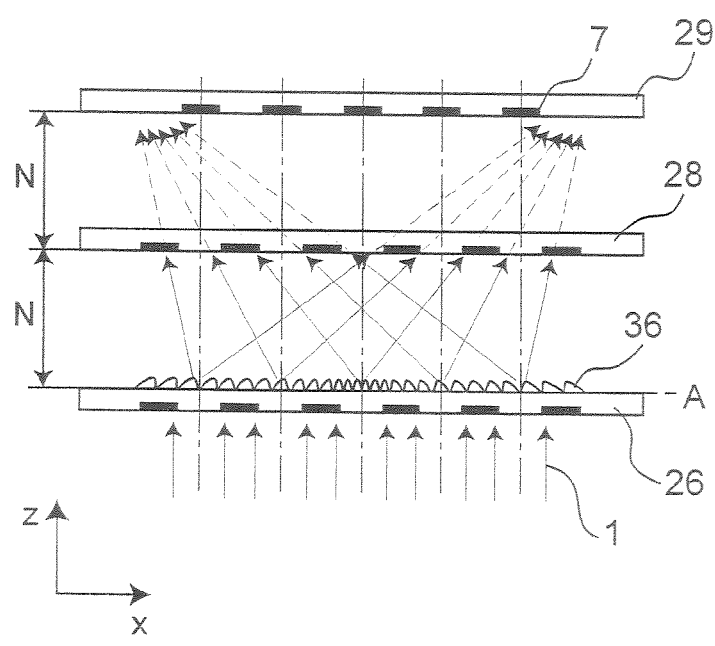
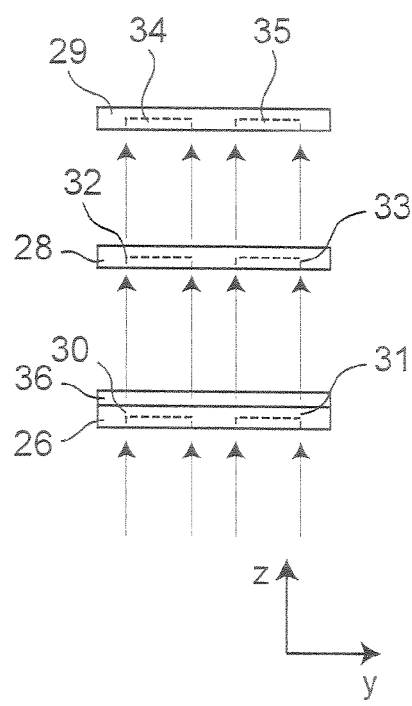
Fig.11A
Fig.11B

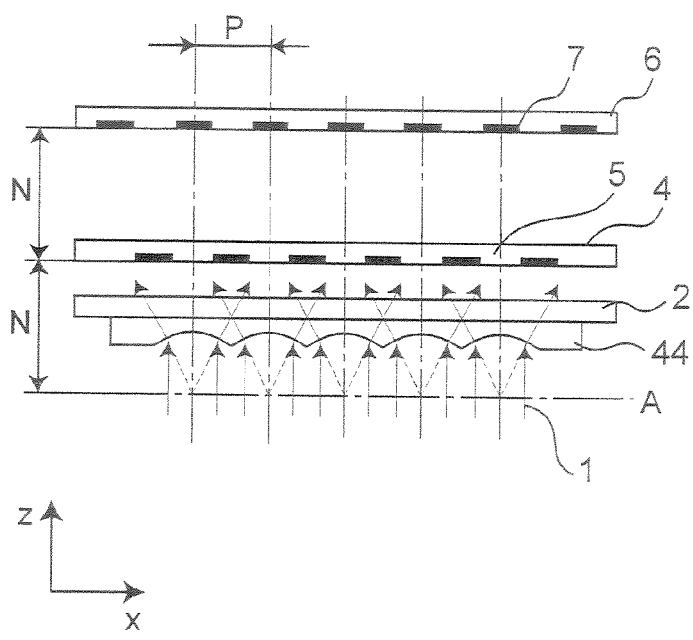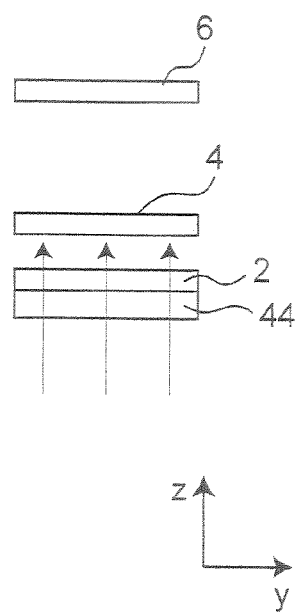

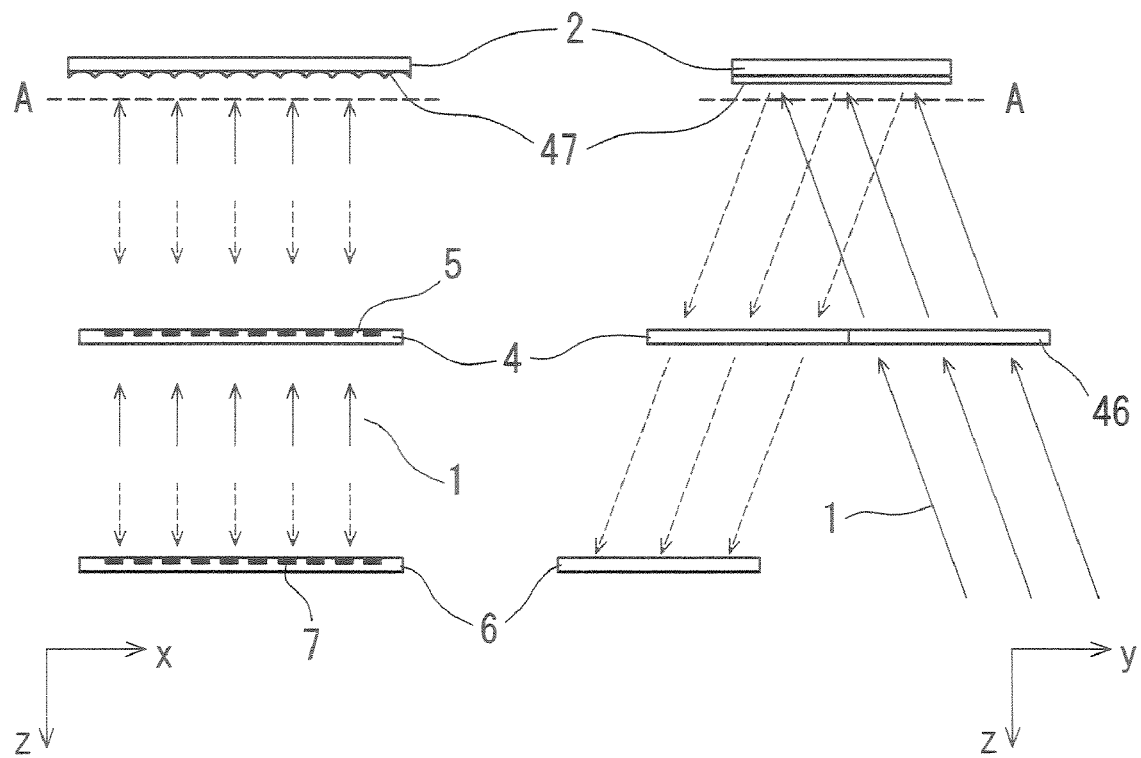

OPTICAL ENCODER APPLYING SUBSTANTIALLY PARALLEL LIGHT BEAMS AND THREE PERIODIC OPTICAL ELEMENTS

TECHNICAL FIELD

The present invention relates to an optical encoder for optically detecting a relative movement between each of grating scales.

BACKGROUND OF THE INVENTION

One of known optical encoders comprises three grating scale plates. In this optical encoder, the three scale plates are disposed in order along a light traveling direction, with the main surfaces of the scale plates in parallel with one another so that the gratings on the scale plates can be arrayed in the same direction. A low spatially coherent light source is disposed in the front of the first scale plate, and a light-receiving element which converts a light quantity into an electric signal is disposed in the rear of the third scale plate.

The operation of this optical encoder is disclosed in Non-Patent Literature 1. According to this Literature, when the light source illuminates the first scale plate, secondary light sources having low spatial coherences, arrayed at a certain cycle and having a multislit-like light quantity distribution, are formed. The second scale plate acts as a spatial frequency filter having a certain optical transmission function (or OTF) and extracts only a specific spatial frequency component from the light quantity distribution of the secondary light sources, so that such a specific spatial frequency component can be formed as an image on the third scale plate. The light beams having passed through the light transmitting portions of the grating provided on the third scale plate are converted into an electric signal by the light-receiving element. When the first scale plate or the second scale plate is relatively moved along the grating-arraying directions, an output signal having a correlation to this relative position is obtained.

For example, when the light quantities of the secondary light sources formed by the first scale plate are distributed like a sine wave with a certain cycle P, and when the optical transmission function of the grating provided on the second scale plate contains a spatial frequency corresponding to the cycle P, an image having a sine wave-like light quantity distribution with the cycle P is formed on the third scale plate.

In this case, the optical transmission function of the second scale plate varies depending on the grating cycle of the second scale plate, the shapes of the slits of the grating, the shape of the grating itself (in case of a phase grating), the interval between the second scale plate and the first scale plate and the interval between the second scale plate and the third scale plate. In general, an optical encoder is designed by selecting conditions which sharpen the contrast of a light quantity distribution formed as an image or a third scale plate.

An optical encoder disclosed in Patent Literature 1 comprises three scale plates each of which has thereon an amplitude grating having rectangular slits, wherein the interval between the first scale plate and the second scale plate is equal to the interval between the second scale plate and the third scale plate, and wherein the grating cycles of the first and third scale plates are designed to be 2P which is twice larger than the grating cycle P of the second scale plate.

An optical encoder disclosed in Patent Literature 2 employs a first scale plate having thereon a phase grating which generates a shading pattern by way of a light interference phenomenon.

In each of the optical encoders disclosed in Patent Literature 1 and Patent Literature 2, the third scale plate and the light-receiving element disposed on the rear of the third scale plate may be replaced with a light-receiving element array which has a light-receiving portions with the same dimensions as the dimensions of the slits of the grating on the third scale plate, so that this light-receiving element array concurrently can have the functions or the third scale plate and the light-receiving element.

Patent Literature 1: JP-A-63-153408 (1988)
Patent Literature 2: JP-A-01-2761 (1998)
Non-Patent Literature 1: K. Hane and C. P Grover, "Imaging with rectangular transmission gratings", J. Opt. Soc. Am. A4, No. 4, pp 706-711, 1987

DISCLOSURE OF THE INVENTION

Problems to be Solved by the Invention

FIG. 24, consisting of FIGS. 24(a) and 24(b), shows schematic diagrams of an optical encoder according to the prior art which includes a first scale plate and a second scale plate both having amplitude gratings thereon as in Patent Literature 1 and Non-Patent Literature 1. FIG. 24(a) shows a front view thereof, and FIG. 24(b) shows a side view thereof. When the light source 101 having a spatially low coherence such as LED emits diffused light beams 102 onto the first scale plate 103 which has an amplitude grating with a cycle P thereon, the light beams sequentially reach the second scale plate 104 and the third scale plate 105, and then reach the light-receiving element 106.

A certain light quantity distribution of secondary light sources is generated on the amplitude grating provided on the first scale plate 103. Out of such a light quantity distribution of the secondary light sources, only frequency components which the second scale plate 104 functioning as a spatial frequency filter transmits are transmitted to the third scale plate 105 and are formed as an image on the third scale plate 105. When the first scale plate 103 and the second scale plate 104 are relatively moved along the grating-arraying direction (the direction X), the image on the third scale plate 105 also moves, and an output signal having a correlation to the relative movement of the second scale plate is obtained from the light-receiving element 106.

Since the first and second scale plates have the amplitude gratings thereon, the quantity of the light reaching the third scale plate 105 or the light-receiving element 106 substantially depends on the slit ratios of the above amplitude gratings. For example, when the ratio of the slit width to the grating cycle of each of the first and second scale plates is "1:2" (the duty ratio: 50%), the quantity of the light which reaches the third scale plate 105 is 25% or less of the quantity of the light which illuminates the first scale plate. In addition, the light is no allowed to efficiently reach the light-receiving element 106, since the diffused light beams 102 (i.e. non-collimated light) illuminate the first scale plate. As a result, the light quantity detected by the light-receiving element 106 becomes smaller, which is likely to lower the characteristics of the optical encoder such as detection resolution, detection accuracy, etc.

Further, the light 102 diffuses also in a direction (the direction Y) perpendicular to the scale pattern-arraying direction, and thus, the light beams from the light source 101 can not be efficiently transmitted to the light-receiving element.

If scale plates each having a plurality of scale patterns (or tracks) is used, a light beam having passed through a certain track of the first or second scale plate is likely to follow a track different from a corresponding track of the second or third scale plate, which may lead to a detection error.

The optical encoder according to Patent Literature 2 includes a first scale plate having a transparent phase grating thereon, and has a feature in that diffracted light beams from the respective gratings interfere with one another to form a shading pattern having a certain cycle. However, a shading pattern distribution formed by the phase gratings by way of diffraction and interference phenomena varies appreciably depending on the phase grating cycles, the shapes of the phase gratings and the wavelength of the light source, which may increase the number of matters to be limited in view of design tolerance, working precision, control of components, etc. Further, like Patent Literature 1, diffused light beams illuminate the first scale plate, and therefore, such light beams can not be allowed to efficiently reach the light-receiving element. Furthermore, the position of the diffused light source and a variation in the radiation characteristics of the diffused light source change the position, cycle and distortion of the shading pattern formed by the first scale plate, which may be likely to lower the characteristics of the optical encoder.

An object of the present invention is to improve the characteristics of an optical encoder such as detection resolution, detection precision, etc. by increasing the quantity of light which a light-receiving element receives Another object of the present invention is to provide an optical encoder which is less influenced by variation in manufacturing conditions. A further object of the present invention is to provide an optical encoder which shows less error in detection, even when scale plate each having a plurality of scale patterns thereon are used.

Means for Solving Problems

The present invention has been developed to achieve these objects, and an optical encoder for measuring a relative movement of a first scale plate and a second scale plate, according to the present invention, comprises
  a light source.
  a lens which converts light from the light source into substantially parallel light beams,
  a first scale plate having thereon an optic array which converges or diffuses the light beams emitted from the light source through the lens, in a predetermined cyclic direction, to generate a cyclic light quantity distribution,
  a second scale plate which cyclically makes spatial modulation on the light beams from the first scale plate,
  a third scale plate having slits which the light beams from the second scale plate pass through, and
  a light-receiving element which receives the light beams from the third scale plate.

Another optical encoder for measuring a relative movement of a first scale plate and a second scale plate, according to the present invention, comprises
  a light source,
  a cylindrical lens which converges light beams from the light source only in a direction perpendicular to a predetermined cyclic direction and converts them into parallel light beams,
  a first scale plate which converts the light beams emitted from the light source through the cylindrical lens, into a light quantity distribution which is cyclic in the above cyclic direction,
  a second scale plate which cyclically makes spatial modulation on the light beams from the first scale plate,
  a third scale plate having slits which the light beams from the second scale pass through, and
  a light-receiving element which receives the light beams from the third scale plate.

A further optical encoder for measuring a relative movement of a first scale plate and a second scale plate, according to the present invention, comprises
  a light source,
  a lens which converts light beams from the light source into substantially parallel light beams,
  a first scale plate having, thereon, an amplitude grating which converts the light beams emitted from the light source through the lens, into a cyclic light quantity distribution, and an optic which diffuses or refracts the light beams only in one direction,
  a second scale plate which cyclically makes spatial modulation on the light beams from the first scale plate
  a third scale plate having slits which the light beams from the second scale pass through, and
  a light-receiving element which receives the light beams from the third scale plate.

Effect of the Intention

According to the present invention, there can be provided a shading pattern-forming means provided on a first scale plate, and this shading pattern-forming means can form a shading pattern distribution independently of an error in shape and the wavelength and position of a light source, and can transmit or reflect an about 2 times larger light quantity through or on an amplitude grating with a duty ratio of 50%, to thereby transmit an about 2 times larger light quantity to a light-receiving element. In this shading pattern-forming means, the diffusing angle of light beams in the scale pattern-arraying direction can be controlled on the first scale plate, and the light from the light source can be efficiently allowed to reach the light-receiving element. Further, the light beams are not diffused in a direction perpendicular to the scale pattern-arraying direction, so that the light beams from the light source can be efficiently transmitted to the light-receiving element.

BRIEF DESCRIPTION OF THE DRAWINGS

FIG. 1, consisting of FIGS. 1(a), 1(b) and 1(c), shows an optical encoder according to the first embodiment of the present invention, illustrating a first scale plate, a second scale plate and a light-receiving element array-provided substrate, wherein FIG. 1(a) is a front view of the optical encoder; FIG. 1(b) is a side view thereof; and FIG. 1(c) shows a light quantity distribution on a pane A.

FIG. 2, consisting of FIGS. 2(a) and 2(b), shows an optical encoder according to the second embodiment of the present invention, illustrating a first scale plate, a second scale plate and a light-receiving element array-provided substrate, wherein FIG. 2(a) is a front view of the optical encoder; and FIG. 2(b) is a side view thereof.

FIG. 3, consisting of FIGS. 3(a) and 3(b), shows an optical encoder according to the third embodiment of the present invention, illustrating a first scale plate, a second scale plate and a light-receiving element array-provided substrate, wherein FIG. 3(a) is a front view of the optical encoder; and FIG. 3(b) is a side view thereof.

FIG. 4, consisting of FIGS. 4(a) and 4(b), shows an optical encoder according to the fourth embodiment of the present invention, illustrating a first scale plate, a second scale plate and a light-receiving element array-provided substrate wherein FIG. 4(a) is a front view of the optical encoder; and FIG. 4(b) is a side view thereof.

FIG. 5 consisting of FIGS. 5(a) and 5(b) shows an optical encoder according to the fifth embodiment of the present invention, illustrating a first scale plate, a second scale plate and a light-receiving element array-provided substrates wherein FIG. 5(a) is a front view of the optical encoder; and FIG. 5(b) is a side view thereof.

FIG. 6, consisting of FIGS. 6(a) and 6(b), shows an optical encoder according to the sixth embodiment of the present invention, illustrating a first scale plate, a second scale plate and a light-receiving element array-provided substrate, wherein FIG. 6(a) is a front view of the optical encoder; and FIG. 6(b) is a side view thereof.

FIG. 7, consisting of FIGS. 7(a) and 7(b), shows an optical encoder according to the seventh embodiment of the present invention, illustrating a first scale plates a second scale plate and a light-receiving element array-provided substrate, wherein FIG. 7(a) is a front view of the optical encoder; and FIG. 7(b) is a side view thereof.

FIG. 8, consisting of FIGS. 8(a) and 8(b), shows an optical encoder according to the eighth embodiment of the present invention, illustrating a first scale plate, a second scale plate and a light-receiving element array-provided substrate, wherein FIG. 8(a) is a front view of the optical encoder; and FIG. 8(b) is a side view thereof.

FIG. 9, consisting of FIGS. 9(a) and 9(b), shows an optical encoder according to the ninth embodiment of the present invention, illustrating a first scale plate, a second scale plate and a light-receiving element array-provided substrate, wherein FIG. 9(a) is a front view of the optical encoder; and FIG. 9(b) is a side view thereof.

FIG. 10, consisting of FIGS. 10(a) and 10(b), shows an optical encoder according to the tenth embodiment of the present invention, illustrating a first scale plate, a second scale plate and a light-receiving element array-provided substrate, wherein FIG. 10(a) is a front view of the optical encoder; and FIG. 10(b) is a side view thereof.

FIG. 11, consisting of FIGS. 11(a) and 11(b), shows an optical encoder according to the eleventh embodiment of the present invention, illustrating a first scale plate, a second scale plate and a light-receiving element array-provided substrate, wherein FIG. 11(a) is a front view of the optical encoder; and FIG. 11(b) is a side view thereof.

FIG. 12, consisting of FIGS. 12(a) and 12(b), shows an optical encoder according to the twelfth embodiment of the present invention, illustrating a first scale plate a second scale plate and a light-receiving element array-provided substrate, wherein

FIG. 16, consisting of FIGS. 15(a) and 16(b), shows an optical encoder according to the sixteenth embodiment of the present invention, illustrating a first scale plate, a second scale plane and a light-receiving element array-provided substrate, wherein FIG. 16(a) is a front view of the optical encoder; and FIG. 16(b) is a side view thereof.

FIG. 21, consisting of FIGS. 21(a) and 21(b), shows an optical encoder according to the twenty-first embodiment of the present invention, illustrating a first scale plate, a second scale plate and a light-receiving element array-provided substrate, wherein FIG. 21(a) is a front view of the optical encoder; and FIG. 21(b) is a side view thereof.

FIG. 24, consisting of FIGS. 24(a) and 24(b), snows an optical encoder according to the prior art, illustrating the schematic arrangement thereof, wherein

DESCRIPTION OF NUMERALS

Figure 12A:
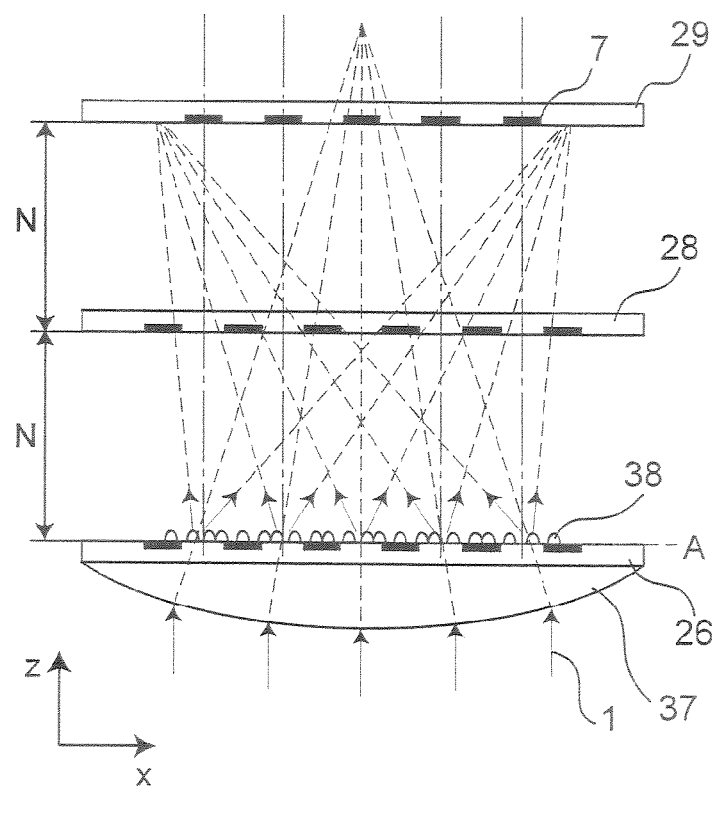
FIG. 12(a) is a front view of the optical encoder.

2=a first scale plate, 3=a cylindrical lens array, 4=a second scale plate, 6=a third scale plate (or a light-receiving element array-provided substrate), 7=light-receiving element (or a light-receiving portion), 8 and 9=diffusers, 10=a prism array, 11=a light source, 12=a lens, 12=a diffraction optic array, 14=a light source, 16=a cylindrical lens, 17=a first scale plate, 18=a second scale plate, 19=a third scale plate (or a light-receiving element array-provided substrate), 20 and 21=tracks (of the first scale plate), 22 and 23=tracks (of the second scale plate), 24 and 25=tracks (of the third scale plate), 26=a first scale plate, 27=a diffuser, 28=a second scale plate, 29=a third scale plate (or a light-receiving element array-provided substrate, 30 and 31=tracks (of the first scale plate), 32 and 33=tracks (of the second scale plate), 34 and 35=tracks (of the third scale plate), 36=a diffuser, 37=a cylindrical lens, 38=a diffuser, 39 and 39'=prism arrays, 40=a reflection type scale plate, 43 and 43'=prism arrays, 44=a cylindrical lens array, 45=a cylindrical lens array, 46=an optical window, 47=a cylindrical concave mirror array, 48=a cylindrical convex mirror array, 49=a lens, 50=a cylindrical lens array, 51=a reflectors 52=a second scale plate, and 53=a phase grating.

BEST MODES FOR CARRYING OUT THE INVENTION

Generally, amplitude gratings are used in an optical encoder including three grating scale plates (cf. Patent Literature 1 and Non-Patent Literature 1), which suffers from the problem that the quantity of light incoming to a light-receiving element is small, as described above. To overcome this problem, the first scale plate is provided with a cylindrical lens array to thereby form a shading pattern by making use of light-converging actions of the respective lenses, differently from the phase grating disclosed in Patent Literature 2. In other words, this shading pattern is equivalent to optical patterns which are formed by the lenses alone and which are disposed in array.

In an encoder of this type, it is desirable to form a sine wave-like shading pattern on the first scale plate. When a phase grating is used to form a sine wave-like shading pattern, a position (in a light traveling direction) at which the shading pattern is formed, and the shape or distortion of the shading pattern appreciably change depending on the cycle and depth of the phase grating and the wavelength of illuminating light, and therefore, the design tolerance for forming a desired shading pattern is small. As a result, matters to be restricted, such as working accuracy, control of components, etc. are increased in number, which leads to a narrower usable region.

In contrast, when a first scale plate is provided with a cylindrical lens array, a position (in a light traveling direction) at which a shading pattern is formed, and the shape of the shading pattern can be changed by changing the curvatures and shapes of the cylindrical lenses. In this case, design values for forming a desired shading pattern are not limitative, and thus, the design tolerance is large. Further, the influence of the wavelength of light on the sanding pattern becomes lower than the case of the phase grating. Accordingly, the matters to be restricted, such as the working accuracy and the control of components, are decreased in number, so that the usable region becomes wider The first scale plate is illuminated with substantially parallel light beams from a light source having low coherence such as a LED or the like, and the substantially parallel light beams are diffused only in a scale pattern-arraying direction by the cylindrical lens array or a diffuser which scatters light beams only in one direction. Further, the diffusing angle relative to the scale pattern-arraying direction can be controlled by the curvature of the cylindrical lens or a diffuser pattern, so that it becomes possible to allow light beams to efficiently reach a light-receiving element.

Since the substantially parallel light beams can be transmitted to the light-receiving element without being diffused in a direction perpendicular to the scale pattern-arraying direction, a detection error which would occur in case of using scale plates each having a plurality of scale patterns (tracks) can be inhibited: that is, a detection error which is caused when a light beam having passed through a certain track of the first or second scale plate reaches a track different from a corresponding track of the second or third scale plate can be inhibited.

Hereinafter, linear type encoders according to all the embodiments of the present invention will be illustrated below, to which the scope of the present invention is not limited, and, of course, the present invention can be applied to rotary type encoders. In case of a rotary type encoder, a light-converging direction and a light-scattering direction coincide with a circular arc scale-arraying direction. In place of the third scale plate and the light-receiving element disposed in the rear of the third scale plate, an array of light-receiving elements is used, or otherwise, a third scale plate and a light receiving element disposed in the rear of the third scale plate may be used.

FIRST EMBODIMENT

FIG. 1 shows an optical encoder according to the first embodiment of the present invention, illustrating a first scale plate, a second scale plate and a light-receiving element array-provided substrate. FIG. 1(a) is a front view thereof; FIG. 1(b) is a side view thereof; and FIG. 1(c) shows a light quantity distribution on a plane A. For example, light beams from a light source having a low spatial coherence (not shown) such as a LED are converted into substantially parallel light beams 1 through a lens or the like (not shown), and then, the first scale plate 2 is illuminated with such substantially parallel light beams 1. Cylindrical lenses 3 are arrayed with a cycle P on the first scale plate 2. The cylindrical lens array 3 converges the substantially parallel light beams 1 only in the direction X on the plane A. A second scale plate 4 is disposed at a position a certain distance Z away from the plane A. Provided on the second scale plate 4 is an amplitude grating having an array of rectangular slits 5 which are arrayed, for example, with a cycle of P, by way of chromium vapor deposition or the like. Further, a light-receiving element array-provided substrate 6 is disposed at a position the certain distance Z away from the second scale plate. Provided on the substrate 6 are rectangular light-receiving portions 7 arrayed with a cycle P. Strictly, the value of the distance Z is a length converted n an air, by taking into account the refracting index of the second scale plate 4, etc. (the same in any of the following embodiments), satisfying the following equation.

$$Z=p^2/4\lambda$$ [Equation 1]

In this equation, $\lambda$ represents the wavelength of a light beam emitted from the light source.

Since the first scale plate 2 is illuminated with the substantially parallel light beams 1 obtained from the light source having a low spatial coherence, the light beams in the direction X on the plane A, formed by the cylindrical lens array 3, have certain widths, and the light quantity distribution in the direction X on the plane A is shaped as a sine wave-like light quantity distribution having the same cycle as the cycle of the cylindrical lens array 3, as shown in FIG. 1(c).

The position of the plane A on which the substantially parallel light beams 1 are converged in the direction X shifts depending on the curvature and shape of the cylindrical lens array 3. When the position of the plane A is closer to the cylindrical lens array 3, in other words, when the focal length becomes shorter, the influence of a variation in the radiation angles of the substantially parallel light beams 1 can be lessened, and an error such as a variation of the cycle P of the light quantity distribution shown in FIG. 1(c) can be decreased. However the scattering angle of the light beams traveling to the second scale plate 4 becomes larger, when the focal length becomes shorter. Accordingly, it is preferable to select a focal length so as to efficiently illuminate the light-receiving element array-provided substrate 6. A desired focal length is such that permits almost all the light beams illuminating the first scale plate (excluding the light beams absorbed to or scattered on a material) to travel to the substrate 6.

Out of the above sine wave-like light quantity distribution, only the frequency components which the second scale plate 4 acting as a spatial frequency filter transmits are formed as an image on the substrate 6. When the first scale plate 2 and the second scale plate 4 are relatively moved to each other along the grating arraying direction (the direction X), the image on the substrate 6 also moves, and an output signal having a correlation to the relative movement of the two scale plates is obtained from the substrate 6.

In the optical encoder according to the first embodiment, almost all the light beams illuminating the first scale plate 2 can be transmitted except for the light beams reflected on the surfaces of the first scale plate 2 and the cylindrical lens array 3 or absorbed thereto, so that the quantity of the light beams illuminating the substrate 6 can be increase. Further, the light beams are not diffused in a direction (the direction Y) perpendicular to the scale pattern-arraying direction, and therefore, the light beams from the light source can be more efficiently transmitted to the light-receiving elements, so that the detected light quantity can be further increased. Therefore, the characteristics of the optical encoder such as detection resolution, detection accuracy, etc. can be improved.

In this embodiment, the interval between the plane A and the second scale plate 4 and the interval between the second scale plate 4 and the substrate 6 are set to Z, respectively; and the cycle of arraying the cylindrical lenses 3 on the first scale plate 2, the cycle of the grating on the second scale plate 4 and the cycle of arraying the light-receiving portions 7 on the substrate 6 are set to P, respectively, although the scope of the present invention is not limited to these values. In other words, all the conditions are allowed, so long as selected intervals and cycles can permit the light quantity distribution on the plane A shown in FIG. 1(c) to be formed as an image on the substrate 6.

Further, this embodiment may employ a Fresnel lens array having a light-converging function only in one direction, instead of the cylindrical lens array 3 comprising cylindrical refractive lenses. Otherwise, an array of isosceles triangular prisms which have the same arraying cycle as that of the cylindrical lenses 3 may be used, and a similar effect can be obtained therefrom.

Further, the second scale plate 4 may be of reflection type, instead of the transmission type as employed in this embodiment. In case of the reflection type the substrate 6 is disposed on the side of the first scale plate 2 relative to the second scale plate 4, preferably on the plane A, and the direction for emitting the substantially parallel light beams 1 is adjusted so that the light quantity distribution on the plane A can be formed as an image on the substrate 6.

SECOND EMBODIMENT

FIG. 2 shows an optical encoder according to the second embodiment of the present invention, illustrating a first scale plate, a second scale plate and a light-receiving element array-provided substrate, wherein FIG. 2(a) is a front view thereof, and FIG. 2(b), a side view thereof.

In the first embodiment, the cylindrical lens array 3 is provided on one surface of the first scale plate 2 on the side of the second scale plate 4, while, in the second embodiment, a cylindrical lens array 3 is provided on one surface of a first scale plate 2 on the opposite side of a second scale plate 4, namely, on the side of a light source. While, in actual use of the optical encoder shown in FIG. 2, light beams are refracted on a surface of the first scale plate 2 on the opposite side of the boundary between the cylindrical lens array 3 and the first scale i.e., on the opposite side of the surface of the first scale plate 2 on which the cylindrical lens array 3 is disposed, such refraction is omitted for convenience to schematical illustrate this embodiment.

Like the first embodiment, a light quantity distribution in the direction X on the plane A is generated as a sine wave-like light quantity distribution having the same cycle P as the cycle of the array of cylindrical lenses 3 as shown in FIG. 1(c).

Out of this sine wave-like light quantity distribution, only frequency components of some light quantities which the second scale plate 4 functioning as a spatial frequency filter transmits are formed as an image on the light-receiving element array-provided substrate 6. When the first scale plate 2 and the second scale plate 4 are moved relative to each other along the grating arraying direction, the image on the substrate 6 also moves, so that an output signal having a correlation to the relative movement of the two scale plates is obtained from the substrate 6.

In the optical encoder according to the second embodiment, almost all light beams illuminating the first scale plate 2 are allowed to pass through the first scale plate 2, except for the light beams reflected on the surfaces of the first scale plate 2 and the cylindrical lens array 3 or absorbed thereto, so that the quantity of light illuminating the substrate 6 can be increased. In addition, the light beams are not diffused in a direction (the direction Y) perpendicular to the scale pattern-arraying direction, so that the light beams from the light source can be more efficiently transmitted to the light-receiving elements, which leads to a further increased detected light quantity. Therefore, it becomes possible to improve the characteristics of the optical encoder such as detection resolution, detection accuracy, etc.

In this embodiment the position of the plane A at which the substantially parallel light beams 1 are converged in the direction X is present inside the first scale plate 2. However, instead of this, the position of the plane A may be present outside the first scale plate 2. Further, in this embodiment, the interval between the plane A and the second scale plate 4 and the interval between the second scale plate 4 and the substrate 6 are set to Z, respectively; and the cycle of arraying the cylindrical lenses 3 on the first scale plate 2, the cycle of the grating on the second scale plate 4 and the cycle of arraying the light-receiving portions 7 on the substrate 6 are set to P, respectively. However, the scope of the present invention is not limited to these values, and all the conditions that permit the light quantity distribution on the plane A shown in FIG. 1(c) be formed as an image on the substrate are also included in the scope of the present invention.

Further, instead of the cylindrical lens array 3 comprising the cylindrical refractive lenses a Fresnel lens array having a light-converging function only in one direction may be used in this embodiment. Otherwise, an isosceles triangular prism array having the same arraying cycle as the cylindrical lens array 3 may be used instead, and a similar effect can be obtained therefrom.

Furthermore, instead of the transmission type scale used for the second scale plate 4, a reflection type scale may be used in this embodiment. In this case, the light-receiving element array-provided substrate 6 is disposed on the side of the first scale plate 2 relative to the second scale plate 4, preferably on the plane A.

THIRD EMBODIMENT

FIG. 3 shows an optical encoder according to the third embodiment of the present invention, illustrating a first scale plate, a second scale plate and a light-receiving element array-provided substrate, wherein FIG. 3(a) is a front view thereof, and FIG. 3(b), a side view thereof.

The arrangement of the third embodiment is substantially the same as that of the second embodiment, except that a diffuser 8 for diffusing light beams only in the direction X is provided on a surface of a first scale plate 2 on the opposite side of a cylindrical lens array 3 thereon. Substantially parallel light beams 1 are converged on the plane A, i.e. or the diffuser 8, by the cylindrical lens array 3, to form secondary light sources having a sine wave-like light quantity distribution. The light beams from the secondary light sources on the plane A are transmitted to a second scale plate 4 while being diffused by the diffuser 8.

Out of the sine wave-like light quantity distribution of the secondary light sources, only the frequency components which the second scale plate functioning as a spatial frequency filter transmits are formed as an image on a light-receiving element array-provided substrate 6. When the first scale plate 2 and the second scale plate 4 are moved relative to each other along the grating arraying direction, the image on the substrate 6 also moves so that an output signal having a correlation to the relative movement of the two scale plates is obtained from the substrate 6.

In the optical encoder according to the third embodiment, almost all light beams illuminating the first scale plate 2 are allowed to pass through the first scale plate 2, except for the light beams reflected on the surfaces of the cylindrical lens array 3 and the diffuser 8 or absorbed thereto, so that the quantity of light illuminating the substrate 6 can be increased. In addition, the light beams are not diffused in a direction perpendicular to the scale pattern-arraying direction, so that the light beams from the light source can be efficiently transmitted to the light-receiving elements, which leads to a further increased detected light quantity.

Further, the use of the diffuser 8 makes it possible to sufficiently lower the coherences of the secondary light sources, so that a light quantity distribution having less noises attributed to the interference of light beams with one another can be formed on the substrate 6. Accordingly, the characteristics of the optical encoder such as detection resolution, detection accuracy, etc. can be improved.

In this embodiment, substantially parallel light beams 1 are converged on the plane A i.e. on the diffuser 8, by the cylindrical lens array 3. In this regard, the plane A and the surface of the diffuser 8 are not perfectly coincident with each other: if they are slightly shifted from each other, a similar effect can be obtained. While, in this embodiment, the diffuser 8 is formed integrally with the first scale plate 2, both of them may be separately formed. Further, in this embodiment, the interval between the plane A and the second scale plate 4 and the interval between the second scale plate 4 and the substrate 6 are set to Z, respectively; and the cycle of arraying the cylindrical lenses 3 on the first scale plate 2, the cycle of the grating on the second scale plate 4 and the cycle of arraying the light-receiving portions 7 on the substrate 6 are set to P, respectively. However, the scope of the present invention is not limited to these values, and all the conditions that permit the light quantity distribution on the plane A shown in FIG. 1(c) to be formed as an image on the substrate 6 are also included in the scope of the present invention.

Further, instead of the cylindrical lens array 3 comprising the cylindrical refractive lenses, a Fresnel lens array having a light-converging function only in one direction may be used in this embodiment. Otherwise, the use of an isosceles triangular prism array having the same arraying cycle as that of the cylindrical lens array 3 is also possible, and a similar effect can be obtained therefrom.

Furthermore, instead of the transmission type scale used for the second scale plate 4, a reflection type scale may be used in this embodiment. In this case, the light-receiving element array-provided substrate 6 is disposed on the side of the first scale plate 2 relative to the second scale plate 4, preferably on the cane A.

FOURTH EMBODIMENT

FIG. 4 shows an optical encoder according to the fourth embodiment of the present invention illustrating a first scale plate a second scale plate and a light-receiving element array-provided substrate, wherein FIG. 4(a) is a front view thereof, and FIG. 4(b), a side view thereof.

The arrangement of the fourth embodiment is substantially the same as that of the third embodiment, except that a diffuser 9 which diffuses light beams only in the direction X and which changes the diffusing angle according to a position in the direction X is provided on a surface of a first scale plate 2 on the opposite side of a cylindrical lens array 3. The diffuser 9 is set to diffuse light beams at a larger diffusing angle at the center of the first scale plate 1 and to diffuse light beams at a smaller diffusing angle at an outer position in the direction X. Such a diffuser 9 is realized by employing a computer generated hologram (or CGH) or the like.

Out of a sine wave-like light quantity distribution generated on the plane A as in the third embodiment, only the frequency components which the second scale plate 4 functioning as a spatial frequency filter transmits are formed as an image on the light-receiving element array-provided substrate 6. When the first scale plate 2 and the second scale plate 4 are moved relative to each other along the grating arraying direction, the image on the substrate 6 also moves, so that an output signal having a correlation to the relative movement of the two scale plates is obtained from the substrate 6.

In the optical encoder according to the fourth embodiment, almost all light beams illuminating the first scale plate 2 are allowed to pass through the first scale plate 2, except for the light beams reflected on the surfaces of the cylindrical lens array 3 and the diffuser 9 or absorbed thereto, so that the quantity of light illuminating the substrate 6 can be increased. In addition, light beams are not diffused in a direction perpendicular to the scale pattern-arraying direction, so that light beams from the light source can be more efficiently transmitted to the light-receiving elements, which leads to a further increased detected light quantity. Further, the use of the diffuser 9 makes it possible to sufficiently lower the coherences of the secondary light sources, so that a light quantity distribution having less noises attributed to the interference of light beams with one another can be formed on the substrate 6.

Further, since the diffusing angle of light beams formed by the diffuser 9 can be changed according to a position in the direction X, it becomes possible to allow the light beams to illuminate only the vicinity of a region on which detecting portions 7 are present on the substrate 6, so that the light beams from the light source can be allowed to more efficiently illuminate the light-receiving elements. Accordingly, the characteristics of the optical encoder such as detection resolution, detection accuracy, etc. can be improved.

In this embodiment, substantially parallel light beams E are converged on the lane A, i.e. on the diffuser 9, by the cylindrical lens array 3 in this regard, the plane A and the surface of the diffuser 9 are not perfectly coincident with each other: if they are slightly shifted from each other, a similar effect can be obtained. While, in this embodiment the diffuser 9 is formed integrally with the first scale plate 2, both of them may be separately formed. Further, in this embodiment, the interval between the plane A and the second scale plate 4 and the interval between the second scale plate 4 and the substrate 6 are set to Z, respectively; and the cycle of arraying the cylindrical lenses 3 on the first scale plate 2, the cycle of the grating on the second scale plate 4 and the cycle of arraying the light-receiving portions on the substrate 6 are set to P, respectively. However, the scope of the present invention is not limited to these values, and all the conditions that permit the light quantity distribution on the plane A shown in FIG. 7(c) to be formed as an image on the substrate 6 are also included in the scope of the present invention.

Further, ad of the cylindrical lens array 3 comprising the cylindrical refractive lenses, a Fresnel lens array having a light-converging function only in one direction may be used in this embodiment. Otherwise, the use of an isosceles triangular prism array having the same arraying cycle as that of the cylindrical lens array 3 is also possible, and a similar effect can be obtained therefrom.

Furthermore instead of the transmission type scale used for the second scale plate 4, a reflection type scale may be used in this embodiment. In this case, the light-receiving element array-provided substrate 6 is disposed on the side of the first scale plate 2 relative to the second scale plate 4, preferably on the plane A.

FIFTH EMBODIMENT

FIG. 5 shows an optical encoder according to the fifth embodiment of the present invention, illustrating a first scale plate, a second scale plate and a light-receiving element array-provided substrate, wherein FIG. 5(a) is a front view thereof, and FIG. 5(b), a side view thereof.

The arrangement of the fifth embodiment is substantially the same as that of the fourth embodiments except that a prism array 10 which refracts light beams only in the direction X and which changes the bending angle according to a position in the direction X is provided on a surface of the first scale plate 2 on the opposite side of a cylindrical lens array 3. The prism array 10 is set to refract light beams at a larger bending angle at the center of the first scale plate 1 and to refract light beams at a smaller bending angle at an outer position in the direction X. As shown in FIG. 5(a), a portion of the prism array (10) located at the right side of the first scale plate 2 scatters the light beams converged by the cylindrical lens array 3, to the left and upward on FIG. 5(a) and allows such light beams to travel to a whole of a region where detecting portions 7 are disposed on the light-receiving element array-provided substrate 6. On the other hand, the other portion of the prism array (10) located at the left side of the first scale plate 2 scatters the light beams converged by the cylindrical lens array 3, to the right and upward on FIG. 5(a) and allows such light beams to travel to a whole of a region where detecting portions 7 are disposed on the light-receiving element array-provided substrate 6. At the center of the prism array 10, the light beams converged by the cylindrical lens array 3 are scattered upward on FIG. 5(a), and travel to a whole of a region where detecting portions 7 are disposed on the light-receiving element array-provided substrate 6.

Out of a sine wave-like light quantity distribution generated on the plane A as in the fourth embodiment only the frequency components which the second scale plate 4 functioning as a spatial frequency filter transmits are formed as an image on the light-receiving element array-provided substrate 6. When the first scale plate 2 and the second scale plate 4 are moved relative to each other along the grating arraying direction, the image on the substrate 6 also moves, so that an output signal having a correlation to the relative movement of the two scale plates is obtained from the substrate 6.

In the optical encoder according to the fifth embodiment, almost all light beams illuminating the first scale plate 2 are allowed to pass through the first scale plate 2, except for the light beams reflected on the surfaces of the cylindrical lens array 3 and the prism array 10 or absorbed thereto, so that the quantity of light illuminating the substrate 6 can be increased. In addition, light beams are not diffused in a direction perpendicular to the scale pattern-arraying direction, so that light beams from the light source can be more efficiently transmitted to the light-receiving elements, which leads to a further increased detected light quantity. Further, since the prism array 10 can change the refracting angle of light beams according to a position in the direction X, it becomes possible to allow light beams to illuminate only the vicinity of a region where detecting portions 7 are disposed on the substrate 6. As a result, light beams from the light source are allowed to more efficiently illuminate the light-receiving elements, which leads to a further increased quantity of detected light. Accordingly, the characteristics of the optical encoder such as detection resolution, detection accuracy, etc. can be improved.

In this embodiment substantially parallel light beams 1 are converged on the plane A i.e. on the prism array 10, by the cylindrical lens array 3. In this regard, the plane A and the surface of the prism array 10 are not perfectly coincident with each other: if they are slightly shifted from each other, a similar effect can be obtained. While, in this embodiment, the prism array 10 is formed integrally with the first scale place 2, both of them may be separately formed. Further, a diffuser which chances a diffusing angle of light beams according to a position in the direction X may be used instead of the prism array 10. Further, in this embodiment, the interval between the plane A and the second scale plate 4 and the interval between the second scale plate 4 and the substrate 6 are set to Z, respectively; and the cycle of arraying the cylindrical lenses 3 on the first scale plate 2, the cycle of the grating on the second scale plate 4 and the cycle of are set to P, respectively. However, the scope of the present invention is not limited to these values, and all the conditions that permit the light quantity distribution on the plane A shown in FIG. 1(c) to be formed as an image on the substrata 6 are also included in the scope of the present invention.

Furthermore, instead of the cylindrical lens array 3 comprising the cylindrical refractive lenses, a Fresnel lens array having a light-converging function only in one direction may be used in this embodiment. Otherwise the use of an isosceles triangular prism array having the same arraying cycle as that of the cylindrical lens array 3 is also possible, and a similar effect can be obtained therefrom.

Furthermore, instead of the transmission type scale used for the second scale plate 4, a reflection type scale may be used in this embodiment. In this case, the light-receiving element array-provided substrate 6 is disposed on the side of the first scale plate 2 relative to the second scale plate 4, preferably on the plane A.

SIXTH EMBODIMENT

FIG. 6 shows an optical encoder according to the sixth embodiment of the present invention, illustrating a first scale plate, a second scale plate and a light-receiving element array-provided substrate, wherein FIG. 6(a) is a front view thereof, and FIG. 6(b), a side view thereof.

The arrangement of the sixth embodiment is substantially the same as that of the first embodiment, except that a lens 12 through which light beams from a light source 11 travel substantially in parallel is integrated to a surface of a first scale plate 2 on the opposite side of a cylindrical lens array 3 thereon.

Out of a sine wave-like light quantity distribution generated on the plane A as in the first embodiment, only the frequency components which the second scale plate 4 functioning as a spatial frequency filter transmits are formed as an image on a light-receiving element array-provided substrate 6. When the first scale plate 2 and the second scale plate 4 are moved relative to each other along the grating arraying direction the image on the substrate 6 also moves, so that an output signal having a correlation to the relative movement of the two scale plates is obtained from the substrate 6.

In the optical encoder according to the sixth embodiment, almost all light beams illuminating the first scale plate 2 are allowed to pass through tire first scale plate 2, except for the light beams reflected on the surfaces of the lens 12 and the cylindrical lens array 3 or absorbed thereto, so that the quantity of light illuminating the substrate 6 can be increased. In addition, light beams are not diffused in a direction perpendicular to the scale pattern-arraying direction, so that the light beams from the light source car be more efficiently transmitted to the light-receiving elements, which leads to a further increased detected light quantity. Accordingly, the characteristics of the optical encoder such as detection resolution, detection accuracy, etc. can be improved.

Further, since the lens 12 is formed integrally with the first scale plate 2, the light source and the lens portion can be shaped with thinner thickness, and the components to be used can be decreased in number, which leads to a lower cost.

Instead of the plano-convex lens used as the lens 12, a Fresnel lens having a similar function may be used in this embodiment.

Further, in this embodiment, the interval between the plane A and the second scale plate 4 and the interval between the second scale plate 4 and the substrate 6 are set to Z, respectively; and the cycle of arraying the cylindrical lenses on other first scale plate 2, the cycle of the grating on the second scale plate 4 and the cycle of arraying the light-receiving portions 7 on the substrate 6 are set to P, respectively. However, the scope of the present invention is not limited to these values, and all the conditions that permit the light quantity distribution on the plane A shown in FIG. 1(c) to be formed as an image on the substrate 6 are also included in the scope of the present invention.

Furthermore, instead of the cylindrical lens array 3 comprising the cylindrical refractive lenses, a Fresnel lens array having a light-converging function only in one direction may be used in this embodiment. Otherwise, the use of an isosceles triangular prism array having the same arraying cycle as that of the cylindrical lens array 3 is also possible, and a similar effect can be obtained therefrom.

Furthermore, instead of the transmission type scale used for the second scale plate 4, a reflection type scale may be used in this embodiment. In this case, the light-receiving element array-provided substrate 6 is disposed on the side of the first scale plate 2 relative to the second scale plate 4, preferably on the plane A.

SEVENTH EMBODIMENT

FIG. 7 shows an optical encoder according to the seventh embodiment of the present invention, illustrating a first scale plate, a second scale plate and a light-receiving element array-provided substrate, wherein FIG. 7(a) is a front view thereof, and FIG. 7(b), a side view thereof.

The arrangement of the seventh embodiment is substantially the same as that of the first embodiment, except that a diffraction optic array 13 which converges substantially parallel light beams 1 only in the direction X on a plane A is provided instead of the cylindrical lens array 3 on the first scale plate 2.

Out of a sine wave-like light quantity distribution generated on the plane A as in the first embodiment, only the frequency components which the second scale plate 4 functioning as a spatial frequency filter transmits are formed as an image on a light-receiving element array-provided substrate 6. When the first scale plate 2 and the second scale plate 4 are moved relative to each other along the grating arraying direction, the image on the substrate 6 also moves, so that an output signal having a correlation to the relative movement of the two scale plates is obtained from the substrate 6.

The diffraction optic array 13 converges light beams by making use of the diffraction and interference of the light beams having reached the respective diffraction optics, and it is possible to change the position of the plane A by changing the shapes of the diffraction optics. Thus, the design tolerance of this embodiment is higher than an optical encoder which uses a phase grating instead of the diffraction optic array 13.

In the optical encoder according to the seventh embodiment, almost all light beams illuminating the first scale plate 2 are allowed to pass through the first scale plate 2, except for the light beams reflected on the surfaces of the first scale plate 2 and the diffraction optic array 13 or absorbed thereto, so that the quantity of light illuminating the substrate 6 can be increased. In addition, light beams are not diffused in a direction perpendicular to the scale pattern-arraying direction, so that light beams from the light source can be more efficiently transmitted to the light-receiving elements, which leads to a further increased detected light quantity. Accordingly, the characteristics of the optical encoder such as detection resolution, detection accuracy, etc. can be improved It is also possible to apply this embodiment to the optical encoders according to the first to sixth embodiments.

Further, in this embodiment, the interval between the plane A and the second scale plate 4 and the interval between the second scale plate 4 and the substrate 6 are set to Z, respectively; and the cycle of arraying the diffraction optics 13 on the first scale plate 2, the cycle of the grating on the second scale plate 4 and the cycle of arraying the light-receiving portions 7 on the substrate 6 are set to P, respectively. However the scope of the present invention is not limited to these values, and all the conditions that permit the light quantity distribution on the plane A shown in FIG. 1(c) to be formed as an image on the substrate 6 are also included in the scope of the present invention.

Furthermore, instead of the transmission type scale used for the second scale plate 4, a reflection type scale plate may be used in this embodiment. In this case, the light-receiving element array-provided substrate 6 is disposed on the side of the first scale plate 2 relative to the second scale plate 4, preferably on the plane A.

EIGHTH EMBODIMENT

FIG. 8 shows an optical encoder according to the eighth embodiment of the present invention, illustrating a first scale plate, a second scale plate and a light-receiving element array-provided substrate 6, wherein FIG. 8(a) is a front view thereof, and FIG. 8(b), a side view thereof.

The optical encoder according to the eighth embodiment differs from the optical encoders according to the first to seventh embodiments, in that an amplitude grating is used or the first sale plate.

As for the dimensions of the light-emitting portion, the length in the direction X is longer, and the length in the direction Y is shorter. For example, light beams 15 from a light source 14 such as a ADD pass through a cylindrical lens 16 which converges the light beams only in the direction Y, and travel substantially in parallel only in the direction Y. The light beams having passed through the cylindrical lens 16 form secondary light sources on the plane A on the first scale plate 17, and a light quantity distribution on the plane A is formed as an image on the light-receiving element array-provided substrate 19, through the second scale plate 18.

In this embodiment, two rows of gratings (tracks) and two rows of light-receiving element arrays are provided on the respective scale plates. That is, tracks 20 and 21 are provided on the first scale plate 17; tracks 22 and 23 are provided on the second scale plate 18; and two corresponding light-receiving element arrays 24 and 25 are provided on the light-receiving element array-provided substrate 19. This is described in detail: out of a light quantity distribution of secondary light sources formed on the track 20 on the first scale plate 17, only the frequency components which the grating pattern of the track 22 on the second scale plate 18 functioning as a spatial frequency filter transmits are formed as a image on the light-receiving element array 24. Similarly, out of a light quantity distribution of secondary light sources formed on the track 21 on the first scale plate 17, only the frequency components which the grating pattern of the track 23 transmits are formed as an image on the light-receiving element array 25. When the first scale plate 17 and the second scale plate 18 are moved relative to each other along the grating arraying direction, the images on the substrate 19 also move, so that output signals having correlations to the relative movement of the two scale plates are obtained from the light-receiving element arrays 24 and 25, respectively. Any of the combinations of the cycles of the gratings on the tracks and the cycles of the light-receiving element arrays is allowed, so long as the light quantity distributions of the secondary light sources on the tracks 20 and 21 can be formed as images on the light-receiving element arrays 24 and 25, respectively. The cycles of the images may not be coincident with each other.

The optical encoder according to the eighth embodiment comprises the scale plates each having a plurality of tracks thereon, wherein a light beam having passed through a certain track on the first or second scale plate is inhibited from incoming to a track different from a corresponding track on the second scale plate or the light-receiving element array-provided substrate. Accordingly, an error in detection can be avoided. Further light bears are not diffused in a direction perpendicular to the scale pattern arraying direction, and therefore, the light beams from the light source can be more efficiently transmitted to the light-receiving elements, so that the quantity of detected light can be increased. The characteristics of the optical encoder such as detection resolution, detection accuracy, etc., therefore, can be improved.

The light source of this embodiment is nor limited to the above light source having the light-emitting section with a length longer in the direction X and a length shorter in the direction Y, and other light source may be used. Further, instead of the cylindrical refractive lens used as the cylindrical lens 16, a Fresnel lens having a light-converging function only in one direction may be used in this embodiment.

Further, in this embodiment, the interval between the plane A and the second scale plate 18 and the interval between the second scale plate 18 and the substrate 19 are set to Z, respectively. However, the scope of the present invention is nor limited to this value, and all the conditions that permit the light quantity distribution on the plane A to be formed as an image on the substrate 19 are also included in the scope of the present invention.

Furthermore, instead of the transmission type scale user for the second scale plate 18, a reflection type scale plate may be used in this embodiment. In this case, the light-receiving element array-provided substrate 19 is disposed on the side of the first scale plate 17 relative to the second scale plate 18, preferably on the plane A.

NINTH EMBODIMENT

FIG. 9 shows an optical encoder according to the ninth embodiment of the present invention, illustrating a first scale plate, a second scale plate and a light-receiving element array-provided substrate, wherein FIG. 9(a) is a front view thereof, and FIG. 9(b), a side view thereof.

The arrangement of the ninth embodiment is substantially the same as that of the fourth embodiment except that an amplitude grating is used on the first scale plate 26. A diffuser 27 which diffuses light beams only in the direction X and changes the diffusing angle according to a position in the direction X is provided on a surface of the first scale plate 26 on the opposite side of the amplitude grating thereon. The diffuser 27 is set to diffuse light beams at a larger angle at the center of the first scale plate 26 and to diffuse light beams at a smaller angle at an outer position in the direction X.

Each of the scale plates and the light-receiving element array-provided substrate 29 has a plurality of tracks provided thereon, as in the eighth embodiment. In this embodiment, two tracks are provided on each of them.

With this arrangement, substantially parallel light beams 1 are allowed to illuminate the respective tracks 30 and 31 on the first scale plate 26. Then out of each of the light quantity distributions of secondary light sources on the plane A, only the frequency components which the grating pattern of each of the tracks 33 and 33 on the second scale plate 28 transmits are formed as an image on each of the corresponding light-receiving element arrays 34 and 35 or the substrate 29, as in the eighth embodiment. When the first scale plate 26 and the second scale plate 30 are moved relative to each other along the grating arraying direction, the images on the substrate 29 also move, so that output signals having correlations to the relative movement of the two scale plates are obtained from the light-receiving element arrays 34 and 35 on the substrate 29, respectively.

The optical encoder according to the ninth embodiment comprises the scale plates each having a plurality of tracks thereon, wherein a light beam having passed through a certain track on the first or second scale plate is inhibited from incoming to a track different from a corresponding track on the second scale plate or the light-receiving element array-provided substrate. Accordingly, an error in detection can be avoided. Further, light beams are not diffused in a direction perpendicular to the scale pattern arraying direction, and therefore, the light beams from the light source can be more efficiently transmitted to the light-receiving elements, so that the quantity of detected light can be increased. Furthermore, the coherences of the secondary light sources can be sufficiently decreased by the diffuser 27, and thus, the light quantity distributions having less noises, attributed to the interference of light beams with one another, can be formed as images on the light-receiving element array-provided substrate 29.

Still furthermore, the diffusing angle of the light beams can be changed according to a position in the direction X by the diffuser 27, and thus, it becomes possible to allow the light beams to illuminate only the vicinity of a region where detecting portions 7 are present on the substrate 29, so that the light beams from the light source can be allowed to illuminate the light-receiving elements, and so that the quantity of detected light can be further increased. Accordingly, the characteristics of the optical encoder such as detection resolution, detection accuracy, etc. can be improved.

In this embodiment, the diffuser 17 is provided on a surface of the first scale plate 26 on the opposite Side of the amplitude grating thereon. However, the scope of the present invention is not limited thereto, and the diffuser 27 may be provided on the surface of the first scale plate having the amplitude grating provided thereon. For example, the amplitude grating is formed by chromium vapor deposition, and then, the diffuser may be formed on the amplitude grating by employing a resin-molding technique or the like. The diffuser 27 is formed integrally with the first scale plate 26 in this embodiment, however, both of them may be formed separately.

Further, in this embodiment, the interval between the plane A and the second scale plate 28 and the interval between the second scale plate 28 and the substrate 29 are set to Z, respectively. However, the scope of the present invention is not limited this value, and all the conditions that permit the light quantity distribution on the plane A to be formed as an image on the substrate 29 are also included in the scope of the present invention.

Furthermore, instead of the transmission type scale used for the second scale plate 28, a reflection type scale plate may be used in this embodiment. In this case, the light-receiving element array-provided substrate 29 is disposed on the side of the first scale plate 26 relative to the second scale plate 28, preferably on the plane A.

TENTH EMBODIMENT

FIG. 10 shows an optical encoder according to the tenth embodiment of the present invention, illustrating a first scale place, a second scale plate and a light-receiving element array-provided substrate, wherein FIG. 10(a) is a front view thereof, and FIG. 10(b), a side view thereof.

The arrangement of the tenth embodiment is substantially the same as that of the ninth embodiment, except that a surface of the first scale plate 26 having a diffuser 27 provided thereon and the other surface thereof having an amplitude grating provided thereon are turned upside down on FIG. 10. In other words, the diffuser 27 is disposed on the side of a light source, and the amplitude grating is disposed on the side of the second scale plate 28. With this arrangement, this optical encoder operates similarly to the ninth embodiment.

The optical encoder according to the tenth embodiment also includes the scale plates each having a plurality of tracks thereon, wherein a light beam having passed through a certain track on the first or second scale plate is inhibited from incoming to a track different from a corresponding track on the second scale plate or the light-receiving element array-provided substrate. Accordingly, an error in detection can be avoided. Further, light beams are no diffused in a direction perpendicular to the scale pattern arraying direction and therefore, the light beams from the light source can be more efficiently transmitted to the light-receiving elements, so that the quantity of detected light can be increased. Furthermore, the coherences of the secondary light sources can be sufficiently decreased by the diffuser 27, and thus, light quantity distributions having less noises, attributed to the interference of light beams with one another, can be formed as images on the light-receiving element array-provided substrate 29.

Still furthermore, the diffusing angle of the light beams can be changed according to a position in the direction X by the diffuser 27, and thus, it becomes possible to allow the light beams to illuminate only the vicinity of a region where detecting portions 7 are present on the substrate 29, so that the light beams from the light source can be allowed to more efficiently illuminate the light-receiving elements, and so that the quantity of detected light can be further increased. Accordingly, the characteristics of the optical encoder such as detection resolution, detection accuracy, etc. can be improved.

ELEVENTH EMBODIMENT

FIG. 11 shows an optical encoder according to the eleventh embodiment, illustrating a first scale plate, a second scale plate and a light-receiving element array-provided substrates wherein FIG. 11(a) shows a front view thereof, and FIG. 11(b) a side view thereof.

The arrangement of the eleventh embodiment is substantially the same as that of the ninth embodiments except that a diffuser 36 which diffuses light beams only in the direction X and changes the diffusing angle according to a position in the direction X is provided on the first scale plate 26 having an amplitude grating formed thereon. As shown in FIG. 11(a) a portion of diffuser 36 located at the right side of the first scale plate 26 diffuses the light beams from the secondary light sources on the plane A, to the left and upward on FIG. 11(a) and allows the light beams to travel to a whole of a region where detecting portions 7 are present on the light-receiving element array-provided substrate 29. On the other hand, another portion of the diffuser 36 located at the left side of the first scale plate 26 diffuses the light beams from secondary light sources formed on the left side, to the right and upward on FIG. 11(a), and allows the light beams to travel to a whole of a region where the detecting portions 7 are present on the light-receiving element array-provided substrate 29. The center portion of the diffuser 36 diffuses the light beams from the secondary light sources on the plane A, upward on FIG. 11(a), and allows the light beams to travel to a whole of the region where detecting portions are present on the substrate 29. Such a diffuser 36 is realized by using a computer generated hologram (or CGH) or the like.

With this arrangement, substantially parallel light beams 1 are allowed to illuminate the respective tracks 30 and 31 on the first scale plate 26. Then, out of each of the light quantity distributions of the secondary light sources on the plane A, only the frequency components which the grating pattern of each of the tracks 32 and 33 on the second scale plate 28 transmits are formed as an image on each of the light-receiving element arrays 34 and 35 on the substrate 29, as in the eighth, ninth and tenth embodiments. When the first scale plate 26 and the second scale plate 28 are moved relative to each other along the grating arraying direction the images on the substrate 29 also move, so that output signals having correlations to the relative movement of the two scale plates are obtained from the light-receiving element arrays 34 and 33 on the substrate 29, respectively.

The optical encoder according to the eleventh embodiment includes the scale plates each having a plurality of tracks thereon, wherein a light beam having passed through a certain track on the first or second scale plate is inhibited from incoming to a track different from a corresponding track on the second scale plate or the light-receiving element array-provided substrate. Accordingly, an error in detection can be avoided. Further, light beams are not diffused in a direction perpendicular to the scale pattern arraying direction and therefore, the light beams from the light source can be more efficiently transmitted to the light-receiving elements, so that the quantity of detected light can be increased. Furthermore, the coherences of the secondary light sources can be sufficiently decreased by the diffuser 36, and thus, light quantity distributions having less noises, attributed to the interference of light beams with one another, can be formed as images on the light-receiving element array-provided substrate 29.

Still furthermore, the diffusing direction of the light beams can be changed according to a position in the direction X by the diffuser 36, and thus it becomes possible to allow the light beams to illuminate only the vicinity of a region where detecting portions 7 are present on the substrate 29, so that the light beams from the light source can be allowed to more efficiently illuminate the light-receiving elements, and so that the quantity of detected light can be further increased. Accordingly, the characteristics of the optical encoder such as detection resolution, detection accuracy, etc. can be improved.

In this embodiment, the diffuser 36 is provided on a surface of the first scale plate 26 on the opposite side of the amplitude gratings thereon. However, the scope of the present invention is not limited thereto, and the diffuser 36 may be provided on the surface of the first scale plate having the amplitude gratings provided thereon. The diffuser 36 is formed integrally with the first scale plate 26 in this embodiment, however, both of them may be formed separately.

Further, in this embodiment, the interval between the plane A and the second scale plate 28 and the interval between the second scale plate 28 and the substrate 29 are set to Z, respectively. However, the scope of the present invention is not limited to this value, and all the conditions that permit the light quantity distributions on the plane A to be formed as images on the substrate 29 are also included in the scope of the present invention.

Furthermore, instead of the transmission type scale used for the second scale plate 28, a reflection type scale plate may be used in this embodiment. In this case, the light-receiving element array-provided substrate 29 is disposed on the side of the first scale plate 26 relative to the second scale plate 28, preferably on the plane A

TWELFTH EMBODIMENT

Figure 12B:
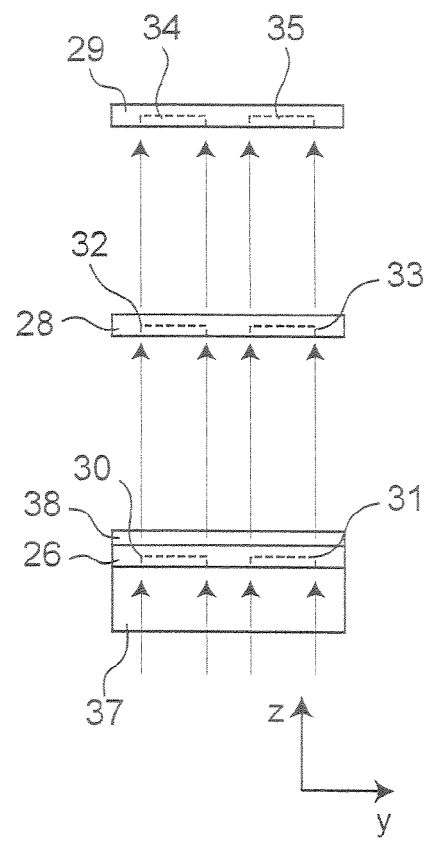
FIG. 12(b) is a side view thereof.

FIG. 12 shows an optical encoder according to the twelfth embodiment illustrating a first scale plate a second scale plate and a light-receiving element array-provided substrate, wherein FIG. 12(a) shows a front view thereof, and FIG. 12(b) a side view thereof.

A cylindrical lens 37 which converges light beams only in the direction X is provided on a first scale plate 26 on the side of a light source. Further, a diffuser 38 which diffuses light beams only in the direction X and fixes the diffusing direction and diffusing angle independently of a position in the direction X is provided on the opposite surface of the first scale plate, namely, on the side of a second scale plate 28. The focusing position of the cylindrical lens 37 is set at the vicinity of a light-receiving element array-provided substrate 29.

As shown in FIG. 12(a), the substantially parallel light beams 1 are refracted by the cylindrical lens 37 so that the light beams are refracted to the left and upward at the right side of the first scale plate 26, and are refracted to the right and upward at the let side of the first scale plate 26. After that, the light beams pass through the amplitude gratings, and then are diffused by the diffuser 38. At this point of time, the light beams from secondary light sources formed on the right side of the plane A diffuse to the left and upward on FIG. 12(a) and travel whole of a region where detecting portions 7 are present the substrate 29. On the other hand, the light beams from secondary light sources formed or be left side of the plane A diffuse to the right and upward on FIG. 12(a) and travel to a whole of a region where detecting portions 7 are present on the substrate 29. The light beams from the secondary light sources on the center of the plane A are diffused upward on FIG. 12(a) and travel to a whole of a region where detecting portions 7 are present on the substrate 36. This arrangement produces a similar effect to that of the eleventh embodiment.

In this embodiment, out of each of the light quantity distributions of the secondary light sources on the plane A, only the frequency components which each of the grating patterns of the tracks 32 and 33 on the second scale plate 28 transmits are formed as an image on each of the corresponding light-receiving element arrays 34 and 35 on the light-receiving element array-provided substrate 29. When the first scale plate 26 and the second scale plate 28 are moved relative to each other along the grating-arraying direction, the images on the light-receiving element array-provided substrate 29 also move, and output signals having correlations to the relative movement of the two scale plates are obtained from the light-receiving element arrays 34 and 35 on the substrate 29, respectively.

The optical encoder according to the twelfth embodiment includes the scale plates each having a plurality of tracks thereon, wherein a light beam having passed through a certain track on the first or second scale plate is inhibited from incoming to a track different from a corresponding track on the second scale plat the light-receiving element array-provided substrate. Accordingly, an error in detection can be avoided. Further, light beams are not diffused in a direction perpendicular to the scale pattern arraying direction and therefore, the light beams from the light source can be more efficiently transmitted to the light-receiving elements, so that the quantity of detected light can be increased. Furthermore, the coherences of the secondary light sources can be sufficiently decreased by the diffuser 38, and thus, the light quantity distributions having less noises, attributed to the interference of light beams with one another, can be formed as images on the light-receiving element array-provided substrate 29.

Still furthermore, the diffusing direction of the light beams can be changed according to a position in the direction X by the diffuser 38, and thus, it becomes possible to allow the light beams to illuminate only the vicinity of a region where detecting portions 7 are present on the substrate 29, so that the light beams from the light source can be a lowed to more efficiently illuminate the light-receiving elements, and so that the quantity of detected light can be further increased. Accordingly, the characteristics of the optical encoder such as detection resolution, detection accuracy, etc. can be improved.

In this embodiment, while the first scale plate 26, the cylindrical lens 37 and the diffuser 38 are formed integrally with one another, they may be formed separately. Further, instead of the cylindrical lens 37 consisting of cylindrical refractive lenses, a Fresnel lens array having a light-converging function only in one direction may be used.

Further, in this embodiment, the interval between the plane A and the second scale plate 28 and the interval between the second scale plate 28 and the substrate 29 are set to Z, respectively. However, the scope of the present invention is not limited to this value, and all the conditions that permit the light quantity distributions on the plane A to be formed as images on the substrate 29 are also included in the scope of the present invention.

Furthermore, instead of the transmission type scale used for the second scale plate 28, a reflection type scale plate may be used in this embodiment. In this case, the light-receiving element array-provided substrate 29 is disposed on the side of the first scale plate 26 relative to the second scale plate 28, preferably on the plane A.

THIRTEENTH EMBODIMENT

FIG. 13 shows optical encoders according to the thirteenth embodiment of the present invention, illustrating first scale plates, second scale plates and light-receiving element array-provided substrates. In this embodiment, reflection type scales are used on the second scale plates.

Figure 13A:
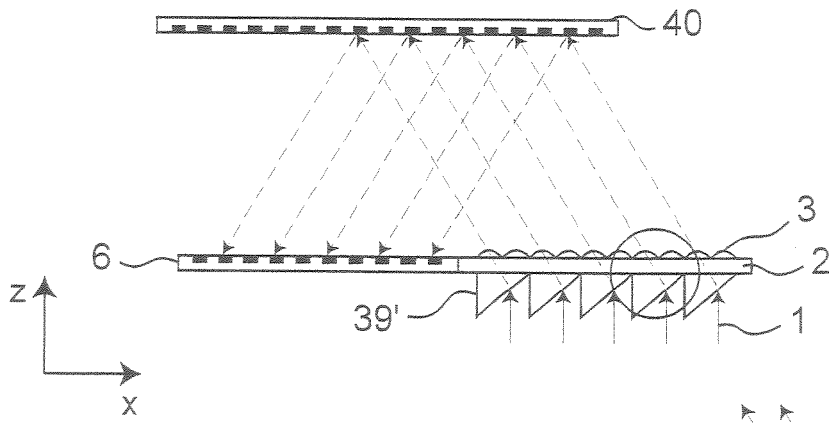
FIG. 13 shows an optical encoder according to the thirteenth embodiment of the present invention, illustrating a first scale plate, a second scale plate and a light-receiving element array-provided substrate.
Figure 13B:
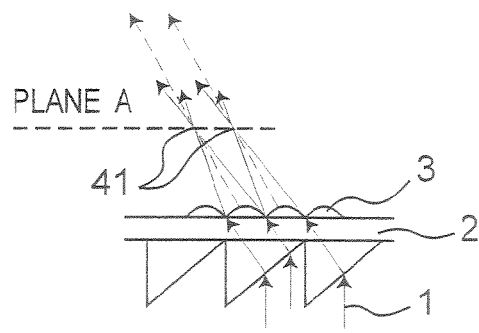
Figure 13C:
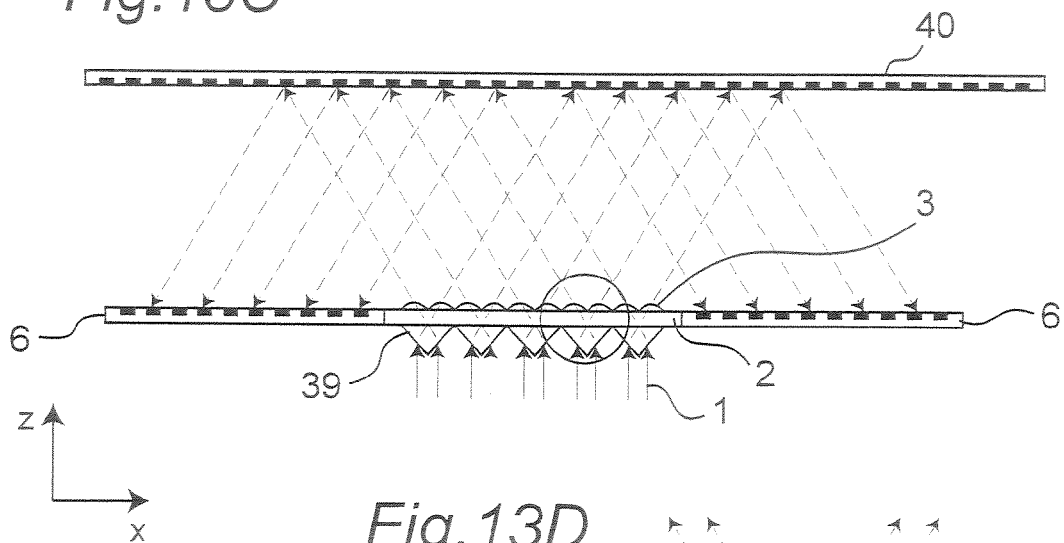

FIGS. 13(a) and 13(c) show the front vies of the optical encoders, wherein FIG. 13(c) shows an optical encoder provided by improving an optical encoder shown in FIG. 13(a). FIG. 13(b) is an enlarged view of the vicinity of the first scale plate of the optical encoder shown in FIG. 13(a), and FIG.

13(d) is an enlarged view of the vicinity of the first scale plate of the optical encoder shown in FIG. 13(c).

First, the optical encoder shown in FIGS. 13(a) and 13(b) is described below.

A prism array 39' which refracts light beams only in a direction X is disposed on a first scale plate 2 on the side of a light source, and a cylindrical lens array 3 which converges light beams only in the direction X is disposed on the first scale plate 2 on the opposite side, i.e. the light outgoing side. A reflection type scale plate 40 is disposed above the first scale plate 2 on the upper side of FIG. 13(a), and a light-receiving element array-provided substrate 6 is disposed at the left side of the first scale plate 2 in the direction X.

Substantially parallel light beams 1 are refracted by the prism array 39', traveling to the left side on FIG. 13(a). Similarly to the first to sixth embodiments, the cylindrical lens array 3 converges the substantially parallel light beams only in the direction X to thereby form secondary light sources 41 whose light quantities generate a sine wave-like light quantity distribution having substantially the same cycle as the lens-arraying cycle of the cylindrical lens array 3. After that, the light beams which outgo from the secondary light sources 41 formed of the above substantially parallel light fluxes travel in the left direction and reflect on the reflection type scale 40, and shines on the light-receiving element array-provided substrate 6. In this regard, the inclining angle of the prism array 39' is so set to optimize the light quantity received by the substrate 6.

Out of the above sine wave-like light quantity distribution, only the frequency components which the reflection type scale plate 40 functioning as a spatial frequency filter transmits are formed as an image on the substrate 6. When the first scale plate 2 and the reflection type scale plate 40 are moved relative to each other along the grating-arraying direction, the image on the substrate 6 also moves, so that an output signal having a correlation to the relative movement of the two scale plates is obtained from the substrate 6.

In the optical encoder according to the thirteenth embodiment, almost all the light beams illuminating the first scale plate 2 are allowed to pass through the first scale plate 2, except for some of the light beams reflected on the surfaces of the prism array 39' and the cylindrical lens array 3 or absorbed thereto, so that the quantity of light illuminating the substrate 6 can be increased. Further, the light beams are nor diffused in a direction perpendicular to the scale pattern-arraying direction, and thus, the light beams from the light source can be more efficiently transmitted to the light-receiving elements, and the quantity of detected light can be further increased. Furthermore, since the traveling direction of the substantially parallel light beams can be controlled by the prism array 39', it becomes possible to allow the light beams to illuminate only the vicinity of a region where detecting portions are present on the substrate 6, so that the light beams from the light source can be allowed to more efficiently illuminate the light-receiving elements, which leads to a further increased quantity of detected light. Accordingly, the characteristics of the optical encoder such as detection resolution, detection accuracy, etc. can be improved.

Instead of the prism array 39', a single prism may be used in this embodiment, and a similar effect can be obtained therefrom. The cycle of the prism array 39' may be optionally selected. Independently of the cycle of the cylindrical lens array 3, and may be so selected that the light quantity distribution of the secondary light sources 41 can be a desired one. Further, while the prism array 39' and the first scale plate 2 are formed integrally with each other in this embodiment, they may be formed separately. Furthermore, while cylindrical refractive lenses are used for the cylindrical lens array 3 in this embodiment, a Fresnel lens array having a light-converging function only in one direction may be used instead.

Figure 13D:
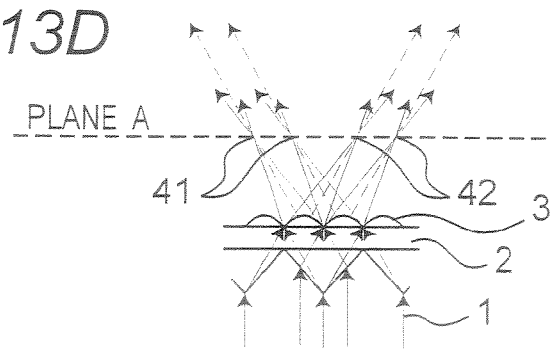

Next, the modified embodiment shown in FIGS. 13(c) and 13(d) is described.

Like the embodiment shown in FIGS. 13(a) and 13(b), a prism array 39 which refracts light beams only in a direction X is disposed on a first scale plate 2 on the side of a light source. This prism array 39 refracts the substantially parallel light beams 1 and splits them into two substantially parallel light fluxes which travel in the right and left directions on FIG. 13(c) respectively. Like the first to sixth embodiments, the substantially parallel light fluxes are converged only in the direction X by a cylindrical lens array 3 to form secondary light sources 41 and 42 whose sine wave-like light quantity distributions have substantially the same cycles as the cycle of the cylindrical lens array 3. After that, the light beams outgoing from the secondary light sources 41 and 42 formed of the above two substantially parallel light fluxes travel in the right and left directions, respectively, and reflect on the reflection type scale place 40, incoming to the light-receiving element array-provided substrates 6 disposed on the right and left sides on FIG. 13(c), respectively. In this regard, the two different inclining angles of the prism array 39 are so selected that the quantities of the light received by the substrates 6 can be optimized.

Out of each of the above sine wave-like light quantity distributions, only the frequency components which the reflection type scale plate 40 functioning as a spatial frequency filter transmits are formed as an image on each of the substrates 6. When the first scale plate 2 and the reflection type scale plate 40 are moved relative to each other along the grating-arraying direction, the images on the substrates 6 also move, so that output signals having correlations to the relative movement of the two scale plates are obtained from the substrates 6.

The embodiment shown in FIGS. 13(c) and 13(d) can produce substantially the same effect as that of the embodiment shown in FIGS. 13(a) and 13(d). In the embodiment shown in FIGS. 13(c) and 3(d), certainly, the light quantity per unit area of each of the light-receiving element array-provided substrates 6 is a half of that of the embodiment shown in FIGS. 13(a) and 13(b). However, the embodiment shown in FIGS. 13(c) and 13(d) has a symmetrical property, and therefore, it is expected that an error contained in a signal detected from one of the right and left light-receiving element arrays can be eliminated by a signal detected from the other light-receiving element array.

In the embodiment shown in FIGS. 13(c) and 13(d), a single prism may be used instead of the prism array 39, and a similar effect can be obtained therefrom.

FOURTEENTH EMBODIMENT

FIG. 14 shows optical encoders according to the fourteenth embodiment, illustrating first scale plates, second scale plates and light-receiving element array-provided substrates. In this embodiment, reflection type scale plates are used for the second scale plates FIGS. 14a) and 14(c) show front views of the optical encoders, and FIGS. 14(b) and 14(d) show side views thereof corresponding to FIGS. 14(a) and 14(c), respectively. The embodiment shown in FIGS. 14(c) and 14(d) is provided by further improving the embodiment shown in FIGS. 14(a) and 14(b).

Figure 14A:
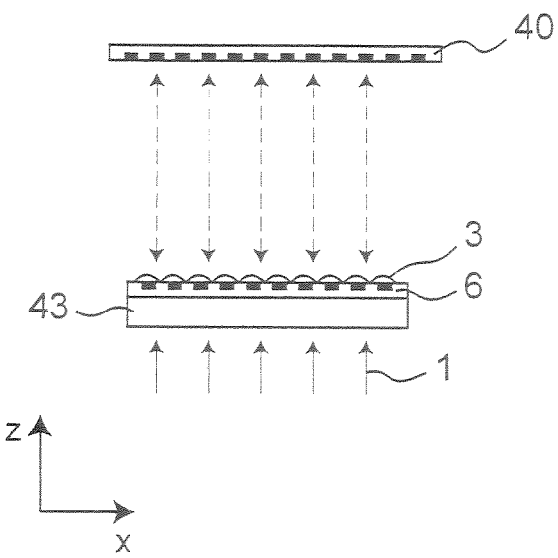
FIG. 14 shows an optical encoder according to the fourteenth embodiment of the present invention, illustrating a first scale plate, a second scale plate and a light-receiving element array-provided substrate.
Figure 14B:
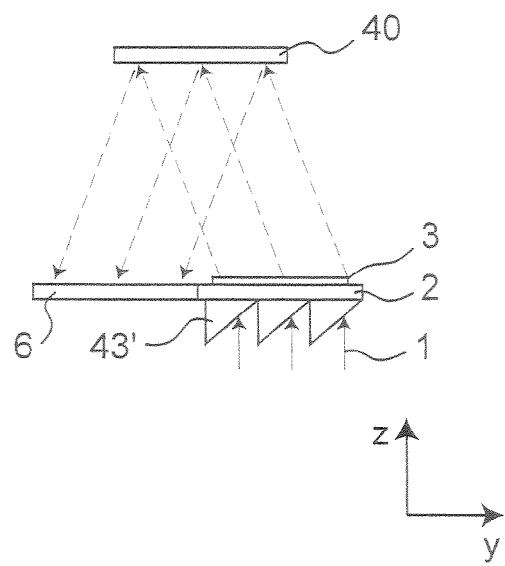

First, the embodiment shown in FIGS. 14(a) and 14(b) is described below.

The fourteenth embodiment has substantially the same arrangement as that of the thirteenth embodiment, except that a prism array 43' which refracts light beams only in the direction Y but not the direction X is disposed on a first scale 2 on the side of a light source, and that a light-receiving easement array-provided substrate 6 is disposed at the left side of the first scale plate 2 in the direction Y.

Substantially parallel light beams L are refracted by the prism array 43' to form substantially parallel light fluxes. The light beams outgoing from secondary light sources formed of the substantially parallel light fluxes travel in the refracted direction, and reflect on a reflection type scale plate 40, incoming to the light-receiving element array-provided substrate 6. In this regard, the inclining angle of the prism array 43' is so selected as to optimize the quantity of the light received by the substrate 6. This embodiment is different from the thirteenth element in the direction to which the substantially parallel light beams are refracted by the prism array 43'.

Out of the sir wave-like light quantity distribution of the secondary light sources, only the frequency components which the reflection type scale plate 40 functioning as a spatial frequency filter transmits are formed as an image on the substrate 6. When the first scale plate 2 and the reflection type scale plate 40 are moved relative to each other along the grating-arraying direction, the image on the substrate 6 also moves, and an output signal having a correlation to the relative movement of the two scale plates obtained from the substrate 6

In the optical encoder according to the fourteenth embodiment, almost all the light beams illuminating the first scale plate 2 are allowed to pass through the first scale plate 2, except for some of the light beams reflected on the surfaces of the prism array 43' and the cylindrical lens array 3 or absorbed thereto, so that the quantity of light illuminating the substrate 6 can be increased. Further, since the traveling direction of the substantially parallel light beams 1 can be controlled by the prism array 43', it becomes possible to allow the light beams to illuminate only the vicinity of a region where detecting portions are present on the substrate 6, so that the light beams from the light source can be allowed to more efficiently illuminate the light-receiving elements, which leads to a further increased quantity of detected light. Accordingly, the characteristics of the optical encoder such as detection resolution, detection accuracy, etc. can be improved.

Instead of the prism array 43', a single prism may be used in this embodiment, and a similar effect can be obtained therefrom. The cycle of the prism array 43' may be optionally selected independently of the cycle of the cylindrical lens array 3, and may be so selected that the light quantity distribution of the secondary light sources 41 can be a desired one. Further, while the prism array 43' and the first scale plate 2 are formed integrally with each other in this embodiment, they may be formed separately. Furthermore, while cylindrical refractive lenses are used for the cylindrical lens array 3 in this embodiment, a Fresnel lens array having a light-converging function only in one direction may be used instead.

Figure 14C:
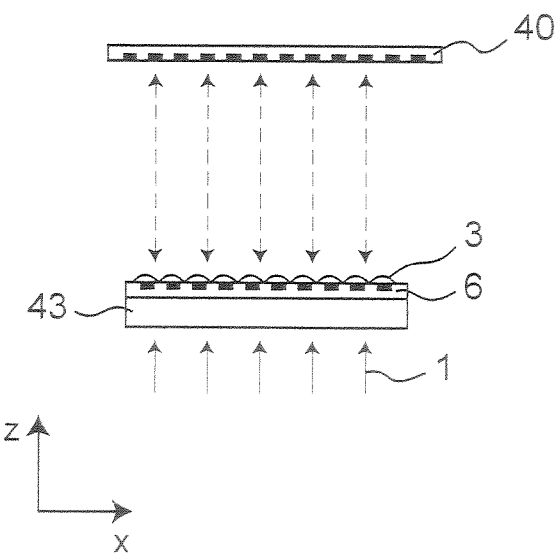
Figure 14D:
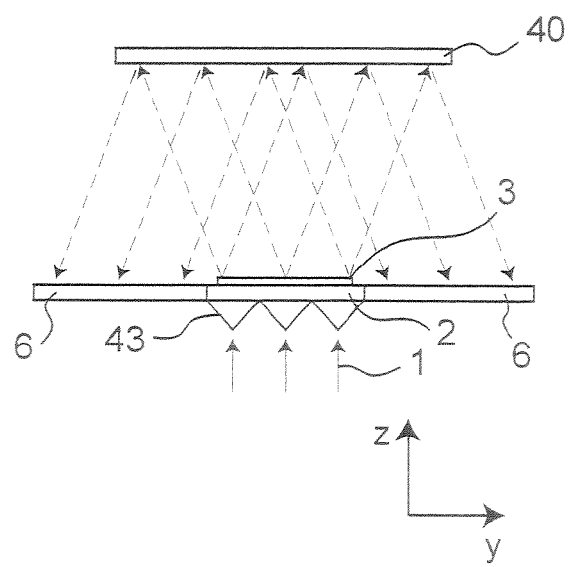

Next, the embodiment shown in FIGS. 14(c) and 14(d) is described.

Like the embodiment shown in FIGS. 14(a) and 14(b), a prism array 43 which refracts light beams only in the direction Y but not the direction X is disposed on a first scale plate 2 on the side of a light source. Light-receiving element array-provided substrates 6 are disposed at both sides of the first scale plate 2 in the direction Y. In other words, the prism array 43 refracts substantially parallel light beams 1 and splits them into two substantially parallel light fluxes.

The light beams outgoing from secondary light sources formed of the two substantially parallel light fluxes travel in the refracted directions, respectively, and reflect on a reflection type scale plate 40, incoming to the light-receiving element array-provided substrates 6 (disposed at two separate positions in the direction Y). In this regard, the inclining angles of the prism array 43 are so selected as to optimize the quantities of the light received by the substrates 6.

Out of each of the sine wave-like light quantity distributions of the secondary light sources, only the frequency components which the reflection type scale plate 40 functioning as a spatial frequency filter transmits are formed as an image on each of the substrates 6. When the first scale plate 2 and the reflection type scale plate 40 are moved relative to each other along the grating-arraying direction, the images on the substrates 6 also move, and output signals each having a correlation to the relative movement of the two scale plates are obtained from the substrates 6.

The embodiment shown in FIGS. 4(c) and 14(d) can produce substantially the same effect as that of the embodiment shown in FIGS. 14(a) and 14(d). In the embodiment shown in FIG. 14(d), certainly, the light quantity per unit area of each of the light-receiving element array-provided substrates 6 is a half of that of the embodiment shown in FIG. 14(b). However, the embodiment shown in FIGS. 14(c) and 14(d) has a symmetrical property, and therefore, it is expected that an error contained in a signal detected from one of the right and left light-receiving element arrays can be eliminated by a signal detected from the other light-receiving element array.

Instead of the prism array 43, a single prism may be used in this embodiment, and a similar effect can be obtained therefrom.

FIFTEENTH EMBODIMENT

FIG. 15 shows optical encoders according to the fourteenth embodiment illustrating first scale plates, second scale plates and light-receiving element array-provided substrates. In this embodiment, reflection type scale plates are used for the second scale plates.

Figure 15A:
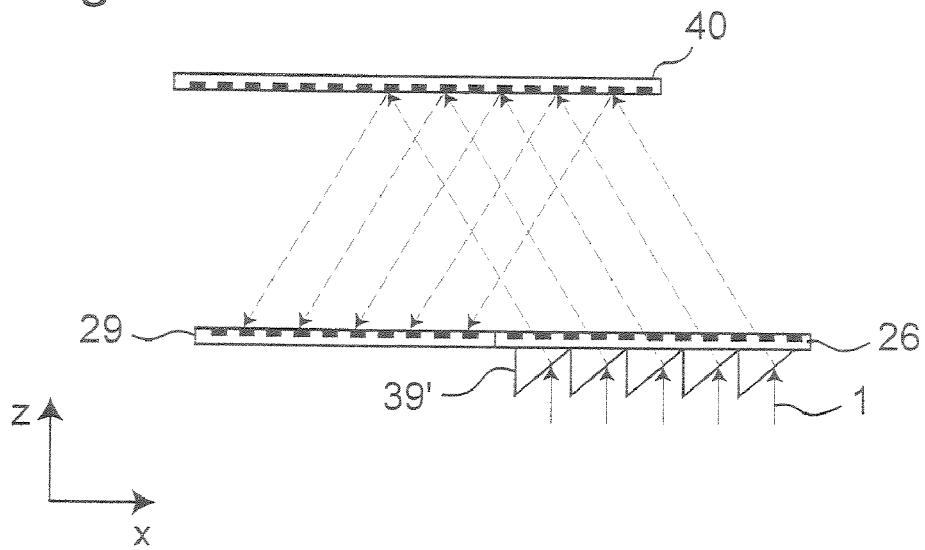
FIG. 15 shows an optical encoder according to the fifteenth embodiment of the present invention, illustrating a first scale plate, a second scale plate and a light-receiving element array-provided substrate.
Figure 15B:
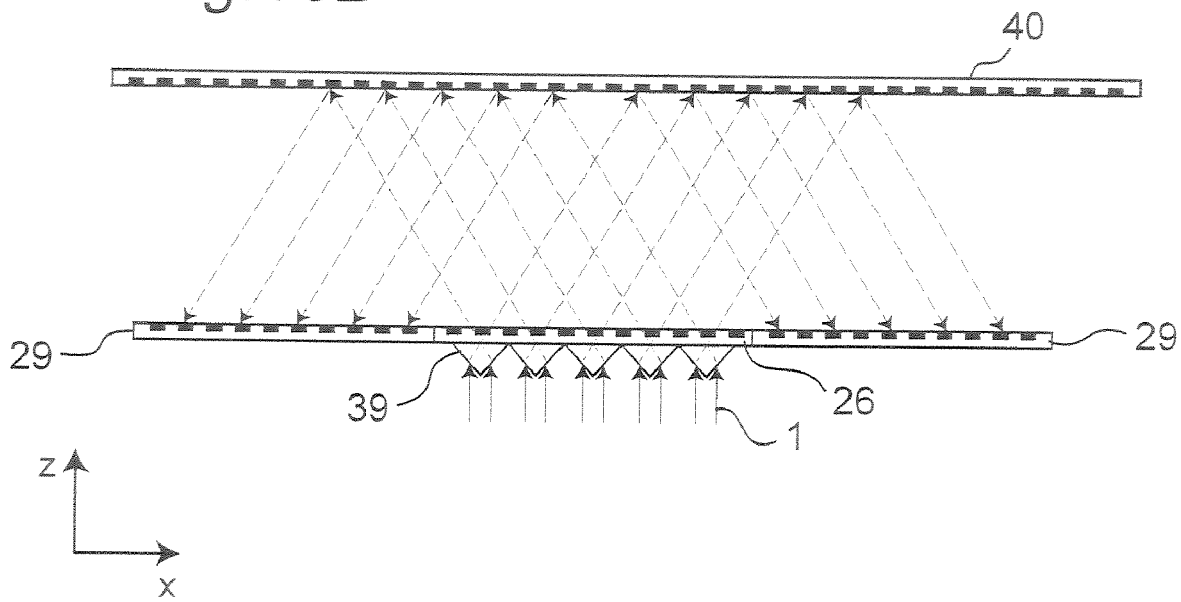

FIGS. 15(a) and 15(b) show front views of the optical encoders, and the embodiment shown in FIG. 15(b) is provided by further improving the embodiment shown in FIG. 15(a).

First, the embodiment shown FIG. 15(a) is described below.

The fifteenth embodiment has substantially the same arrangement as that of the thirteenth embodiment, except that a prism array 39' which refracts light beams only in the direction X, and an amplitude grating is disposed on a first scale plate 26. Substantially parallel light beams 1 are refracted by the prism array 3' to form substantially parallel light fluxes which travel in the left direction on FIG. 15(a). The light beams outgoing from secondary light sources formed of the substantially parallel light fluxes travel in the refracted direction (the left direction on FIG. 15(a)), and reflect on a reflection type scale plate 40, incoming to the light-receiving element array-provided substrate 29. In this regard, the inclining angle of the prism array 39' is so selected as to optimize the quantity of the light received by the substrate 29.

Out of the sine wave-like light quantity distribution of the secondary light sources, only the frequency components which the reflection type scale plate 40 functioning as a spatial frequency filter transmits are formed as an image on the substrate 29. When the first scale plate 26 and the reflection type scale plate 40 are moved relative to each other along the grating-arraying direction, the image on the substrate 29 also moves, and an output signal having a correlation to the relative movement of the two scale plates is obtained from the substrate 29.

In the optical encoder according to the fifteenth embodiment, the light beams are not diffused in a direction perpendicular to the scale pattern-arraying direction, and therefore, the light beams from the light source can be more efficiently transmitted to the light-receiving elements, so that the quantity of detected light can be increased. Further, since the traveling direction of the substantially parallel light beams 1 can be controlled by the prism array 39', it becomes possible to allow the light beams to illuminate only the vicinity of a region where detecting portions are present on the substrate 29, so that the light beams from the light source can be allowed to more efficiently illuminate the light-receiving elements, which leads to a further increased quantity of detected light. Accordingly, the characteristics of the optical encoder such as detection resolution, detection accuracy, etc. can be improved.

Instead of the prism array 39', a single prism may be used in this embodiment, and a similar effect can be obtained therefrom. The cycle of the prism array 39' may be optionally selected independently of the cycle of the amplitude grating on the first scale plate 26, and may be so selected that the light quantity distribution of the secondary light sources can be a desired one. Further, while the prism array 39' and the first scale plate 26 are formed integrally with each other in this embodiment, they may be formed separately.

In this embodiment, the substantially parallel light beams 1 are refracted in the direction X by the prism array 39'. Otherwise, like the fourteenth embodiment, the substantially parallel light beams may be refracted in the direction Y, and the light-receiving element array-provided substrate 29 may be disposed next to the first scale plate 26 in the direction Y. Further, while the prism array 39' is disposed on the light incoming side in this embodiment, the prism array 39' may be disposed on the light outgoing side. Furthermore, while the prism array 39' is disposed on a surface of the first scale plate 26 on the opposite side of the amplitude grating in this embodiment, the prism array 39' may be disposed on the same surface of the first scale plate 26 having the amplitude grating disposed thereon.

Next, the embodiment shown in FIG. 15(*b*) is described.

Like the embodiment shown in FIG. 15(*a*), a prism array 39 which refracts light beams only in the direction X, and an amplitude crating is disposed on a first scale plate 26. This prism array 39 refracts substantially parallel light beams and splits them into two substantially parallel light fluxes which travel in the right and left directions on FIG. 15(*b*), respectively. The light beams outgoing from secondary light sources formed of the two substantially parallel light fluxes travel in the refracted directions (the right and left directions on FIG. 15(*b*)), respectively, and reflect on a reflection type scale plate 40, incoming to the light-receiving element array-provided substrates 29. In this regard, the inclining angles of the prism array 39 are so selected as to optimize the quantities of the light received by the substrates 29.

Out of each of the sine wave-like light quantity distributions of the secondary light sources, only the frequency components which the reflection type scale plate 40 functioning as a spatial frequency filter transmits are formed as an image on each of the substrates 29. When the first scale plate 26 and the reflection type scale plate 40 are moved relative to each other along the grating-arraying direction, the images on the substrates 29 also move, and output signals each having a correlation to the relative movement of the two scale plates are obtained from the substrates 29.

The embodiment shown in FIG. 15(*b*) can produce substantially the same effect as that of the embodiment shown in FIG. 15(*a*). In the embodiment shown in FIG. 1(*b*), certainly, the light quantity per unit area of each of the light-receiving element array-provided substrates 29 is a half of that of the embodiment shown in FIG. 15(*a*). However, the embodiment shown in FIG. 15(*b*) has a symmetrical property, and therefore, it is expected that an error contained in a signal detected from one of the right and left light-receiving element arrays can be eliminated by a signal detected from the other light-receiving element array.

Instead of the prism array 39, a single prism may be used in this embodiment shown in FIG. 15(*b*), and a similar effect can be obtained therefrom. Further, while the substantially parallel light beams 1 are refracted in the direction X by the prism array 39, they may be refracted in the direction Y like the fourteenth embodiment, and each of the light-receiving element array-provided substrates 29 may be disposed next to the first scale plate 26 in the direction Y.

SIXTEENTH EMBODIMENT

Figure 18:
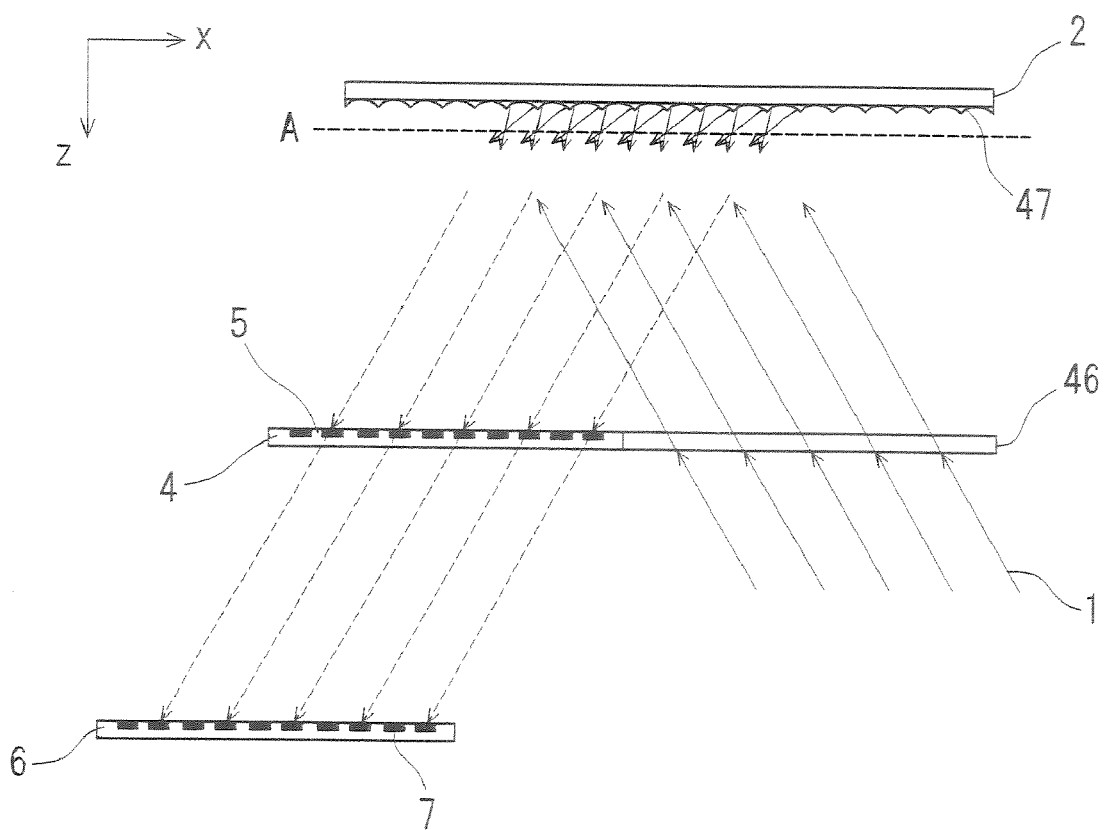
FIG. 18 shows a front view of an optical encoder according to the eighteenth embodiment of the present invention, illustrating a first scale plate, a second scale plate and a light-receiving element array-provided substrate.

FIG. 16 shows an optical encoder according to the sixteenth embodiment, illustrating a first scale plate, a second scale plate and a light-receiving element array-provided substrate, wherein FIG. 18(*a*) shows a front view thereof, and FIG. 16(*b*), a side view thereof.

While convex lenses are used for the cylindrical lens array 3 on the first scale plate 2 in the second embodiment, concave lenses are used for a cylindrical lens array 44 in this embodiment. In practice, light beams are refracted on the boundary between the first scale plate 2 and the cylindrical lens array 44 and on a surface of the first scale plate 2 on the opposite side of the cylindrical lens array 44. However, for the convenience of schematically illustrating this embodiment, the above refraction is omitted from FIG. 16.

Like the second embodiment, secondary light sources having a sine wave-like light quantity distribution are formed in this embodiment. However, the secondary light sources are virtually formed on the plane A on the light incoming side of the first scale plate 2 since the cylindrical lens array 44 comprises convex lenses.

Out of the sine wave-like light quantity distribution of the secondary light sources, only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves and an output signal having a correlation to the relative movement of the two scale plates is obtained from the substrate 6.

In the optical encoder according to the sixteenth embodiment, almost all the light beams illuminating the first scale plate 2 are allowed to pass through the first scale plate 2, except for some of the light beams reflected on the surfaces of the first scale plate 2 and the cylindrical lens array 44 or absorbed thereto, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution, detection accuracy, etc. can be improved.

Furthermore, since the secondary light sources having the sine wave-like light quantity distribution can be formed on the light incoming side of the first scale plate 2, the design freedom can be increased.

In this embodiment, the interval between the plane A and the second scale plate 4 and the interval between the second scale plate 4 and the substrate 6 are set to Z, respectively; and the cycle of arraying the cylindrical lenses 44 on the first scale plate 2, the cycle of the grating on the second scale plate 4 and the cycle of arraying the light-receiving portion 7 on the substrate 6 are set to P, respectively, although the scope of the present invention is not limited to these values. In other words, all the conditions are allowed, so long as selected intervals and cycles can permit the light quantity distribution on the plane A shown in FIG. 1(c) to be formed as an image on the substrate 6.

Further, this embodiment may employ a Fresnel lens array having a light-converging function only in one direction, instead of the cylindrical lens array 44 comprising cylindrical refractive lenses. Otherwise, an isosceles triangular prism array which has the same arraying cycle as that of the cylindrical lens array 44 may be used, and a similar effect can be obtained therefrom. Further, the second scale plate 4 may be of reflection type instead of the transmission type as employed in this embodiment. In case of the reflection type, the substrate 6 is disposed on the side of the first scale plate 2 relative to the second scale plate 4, preferably on the plane A.

SEVENTEENTH EMBODIMENT

Figure 17:
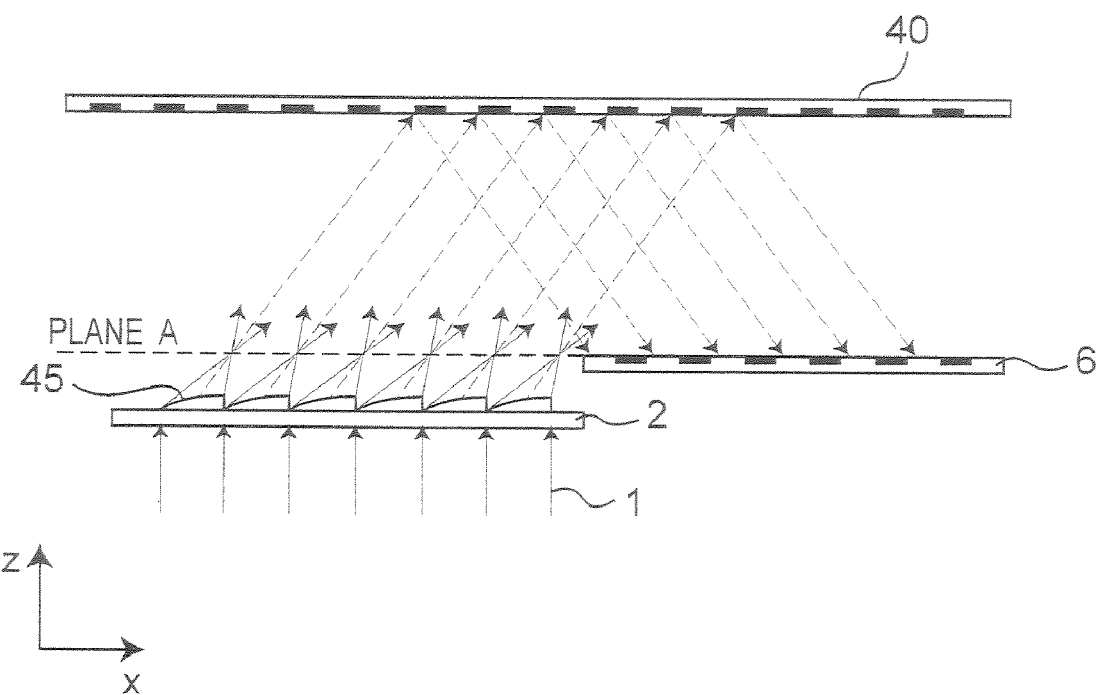
FIG. 17 shows an optical encoder according to the seventeenth embodiment of the present invention, illustrating a first scale plate, a second scale plate and a light-receiving element array-provided substrate.

FIG. 17 shows an optical encoder according to the seventeenth embodiment, illustrating a first scale plate, a second scale plate and a light-receiving element array-provided substrate. In this embodiment, a reflection type scale plate is used for the second scale plate.

In this embodiment shown in FIG. 17, a cylindrical lens array 45 which converges light beams only in the direction X is provided on a first scale plate 2. A reflection type scale plate 40 is disposed on the light outgoing side of the first scale plate 2, and a light-receiving element array-provided substrate 6 is disposed on a plane A next to the first scale plate 2 in the direction X.

The focusing positions of the respective lenses of the cylindrical lens array 45 are present at positions on the plane A, where the incoming light beams refracted in the right direction on FIG. 17 are intersected on the plane A, and these focusing positions have substantially the same cycle as the arraying cycle of the cylindrical lens array 45. Secondary light sources whose light quantities generate a sine wave-like light quantity distribution are formed at these lens focusing positions.

The light beams outgoing from the secondary light sources travel in the right direction on FIG. 17 and reflect on the reflection type scale plate 40, then incoming to the light-receiving element array-provided substrate 6. In this regard, the angle of the tight traveling direction (indicated by the broken lines) attributed to the cylindrical lens array 45 is so selected as to optimize the quantity of the light received by the substrate 6.

Out of the sine wave-like light quantity distribution of the secondary light sources, only the frequency components which the reflection type scale plate 40 functioning as a spatial frequency filter transmits are formed as an image on the substrates 6. When the first scale plate 2 and the reflection type scale plate 40 are moved relative to each other along the grating-arraying direction, the image on the substrate 6 also moves, and an output signal having a correlation to the relative movement of the two scale plates is obtained from the substrate 6.

In the optical encoder according to the seventeenth embodiment, almost all the light beams illuminating the first scale plate 2 are allowed to pass through the first scale plate 2, except for some of the light beams reflected on the surface of the cylindrical lens array 45 or absorbed thereto, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Furthermore, the light traveling direction can be controlled by the shape of the cylindrical lens array 45, and therefore, it becomes possible to allow the light beam to illuminate only the vicinity of a region where the detecting portions are present on the substrate 6, so that the light beams from the light source can be allowed to more efficiently illuminate the light-receiving elements, which leads to a further increased quantity of detected light. Accordingly, the characteristics of the optical encoder such as detection resolution, detection accuracy, etc. can be improved.

In this embodiment, the interval between the plane A and the reflection type scale plate 40 and the interval between the reflection type scale plate 40 and the substrate 6 are equal to each other; and the arraying cycle of the cylindrical lens array 45 on the first scale plate 2, the cycle of the grating on the reflection type scale plate 40 and the arraying cycle of the light-receiving elements on the substrate 6 are equal to one another, although the scope of the present invention is not limited thereto. In other words, all the conditions are allowed, so long as selected intervals and cycles can permit the light quantity distribution on the plane A shown in FIG. 1(c) to be formed as an image on the substrate 6.

Further, in this embodiment, a Fresnal lens array having a light-converging function only in one direction may be used instead of the cylindrical lens array 45 comprising cylindrical refractive lenses. Otherwise, an isosceles triangular prism array which has the same arraying cycle as that of the cylindrical lens array 45 may be used, and a similar effect can be obtained therefrom.

EIGHTEENTH EMBODIMENT

FIG. 18 shows an optical encoder according to the eighteenth embodiment, illustrating a first scale plate, a second scale plate and a light-receiving element array-provided substrate. In this embodiment, a reflection type scale is used for the first scale plate In this embodiment shown in FIG. 18, a cylindrical concave mirror array 47 which converges light beams only in the direction X is provided on a first scale plate 2. A second scale plate 4 is disposed on the light outgoing side of the first scale plate 2, and a light-receiving element array-provided substrate 6 is disposed on the light traveling side. Substantially parallel light beams 1 as incoming light are allowed to shine through an optical window 46 provided on the second scale plate 4.

The substantially parallel light beams 1 pass through the optical window 46, and illuminate the cylindrical concave mirror array 47. Secondary light sources which are arrayed with substantially the same cycle as the arraying cycle of the cylindrical concave mirror array 47 and of which the light quantities generate a sine wave-like light quantity distribution are formed on the focusing positions of the respective concave mirrors on a plane A.

The light beams outgoing from the secondary light sources travel to the left and downward on FIG. 18 and pass through the second scale plate 4, incoming to the light-receiving element array-provided substrate 6. In this regard, the focal lengths of the concave mirrors of the cylindrical concave mirror array 47, and the angles of the traveling directions (indicated by the broken lines) of the reflected light beams from the concave mirrors of the cylindrical concave mirror array 47 are so selected that almost all the light beams illuminating the cylindrical concave mirror array 47 can be allowed to travel to the substrate 6.

Out of the sine wave-like light quantity distribution of the secondary light sources, only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves, and an output signal having a correlation to the relative movement of the two scale plates is obtained from the substrate 6

In the optical encoder according to the eighteenth embodiment, almost all the light beams illuminating the first scale plate 2 are regularly reflected, except for some of the light beams which are absorbed to the cylindrical concave mirror array 47 or scattered therefrom, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution, detection accuracy, etc. can be improved.

In this embodiment the interval between the plane A and the second scale plate 4 and the interval between the second scale plate 4 and the substrate 6 are equal to each other; and the arraying cycle of the cylindrical concave mirror array 47 on the first scale plate 2, the cycle of the grating on the second scale plate 4 and the arraying cycle of the light-receiving elements 7 on the substrate 6 are equal to one another, although the scope of the present invention is not limited thereto. In other words, all the conditions are allowed, so long as selected intervals and cycles can permit the light quantity distribution on the pane A to be formed as an image having the same cycle as the arraying cycle of the light-receiving portions 7 on the substrate 6.

Tin this embodiment, in place of the cylindrical mirror array 47 comprising cylindrical concave mirrors, a mirror array which has a Fresnel lens structure having a light-converging function only in the direction X, or a reflection type diffraction optic array may be used. Otherwise, a triangular mirror array having the same cycle as the arraying cycle of the cylindrical concave mirror array 47 may be used, and a similar effect can be obtained therefrom.

While the optical window 46 is provided in the embodiment shown in FIG. 18, a similar operation is possible without the optical window 46.

NINETEENTH EMBODIMENT

Figure 19:
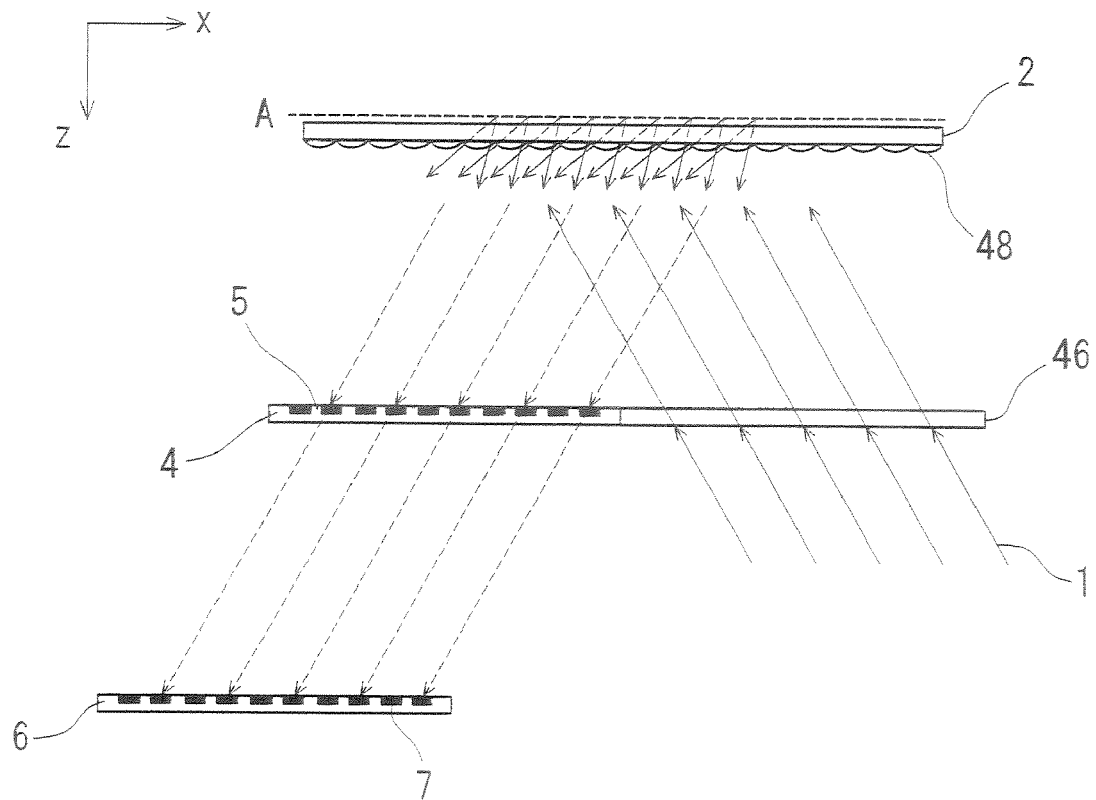
FIG. 19 shows a front view of an optical encoder according to the nineteenth embodiment of the present invention, illustrating a first scale plate, a second scale plate and a light-receiving element array-provided substrate.

FIG. 19 shows a front view of an optical encoder according to the nineteenth embodiment, illustrating a first scale plate, a second scale plate and a light-receiving element array-provided substrate.

While the cylindrical concave mirror array 47 is used as the optic array on the first scale 2 in the embodiment shown in FIG. 18, a cylindrical convex mirror array 48 is provided on a first scale plate 2 in this embodiment.

Like the eighteenth embodiment, secondary light sources whose light quantities generate a sine wave-like light quantity distribution are also formed in this embodiments. However, the secondary light sources are virtually formed on a plane A on the opposite side of the light incoming side of the first scale plate 2 (on the upper side on FIG. 19), because the cylindrical mirror array comprises convex lenses.

In this regard, the focal lengths of the convex mirrors of the cylindrical mirror array 48 and the angles of the traveling directions (indicated by the broken lines) of the reflected light beams from the cylindrical mirror array 48 are so selected that almost all the light beams illuminating the cylindrical convex mirror array 48 can travel to a light-receiving element array-provided substrate 6.

Out of the sine wave-like light quantity distribution of the secondary light sources only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves, and an output signal having a correlation to the relative movement of the two scale plates is obtained from the substrate 6.

In the optical encoder according to the nineteenth embodiment, almost all the light beams illuminating the first scale plate 2 are regularly reflected, except for some of the light beams which are absorbed to the cylindrical convex mirror array 48 or scattered therefrom, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution, detection accuracy, etc. can be improved.

In this embodiment, the interval between the plane A and the second scale plate 4 and the interval between the second scale plate 4 and the substrate 6 are equal to each other; and the arraying cycle of the cylindrical convex mirror array 48 on the first scale plate 2, the cycle of the grating on the second scale plate 4 and the arraying cycle of the light-receiving elements 7 on the substrate 6 are equal to one another, although the scope of the present invention is not limited thereto. In other words, all the conditions are allowed, so long as selected intervals and cycles can permit the light quantity distribution on the plane A to be formed as an image having the same cycle as the arraying cycle of the light-receiving elements 7, on the substrate 6.

In this embodiment, in place of the cylindrical convex mirror array 48 a mirror array which has a Fresnel lens structure having a light-converging function only in the direction X, or a reflection type diffraction optic array may be used. Otherwise, a triangular mirror array having the same cycle as the arraying cycle of the cylindrical convex mirror array 48 may be used, and a similar effect can be obtained therefrom.

While the optical window 46 is provided in the embodiment shown in FIG. 19, a similar operation is possible without the optical window 46.

TWENTIETH EMBODIMENT

Figure 20:
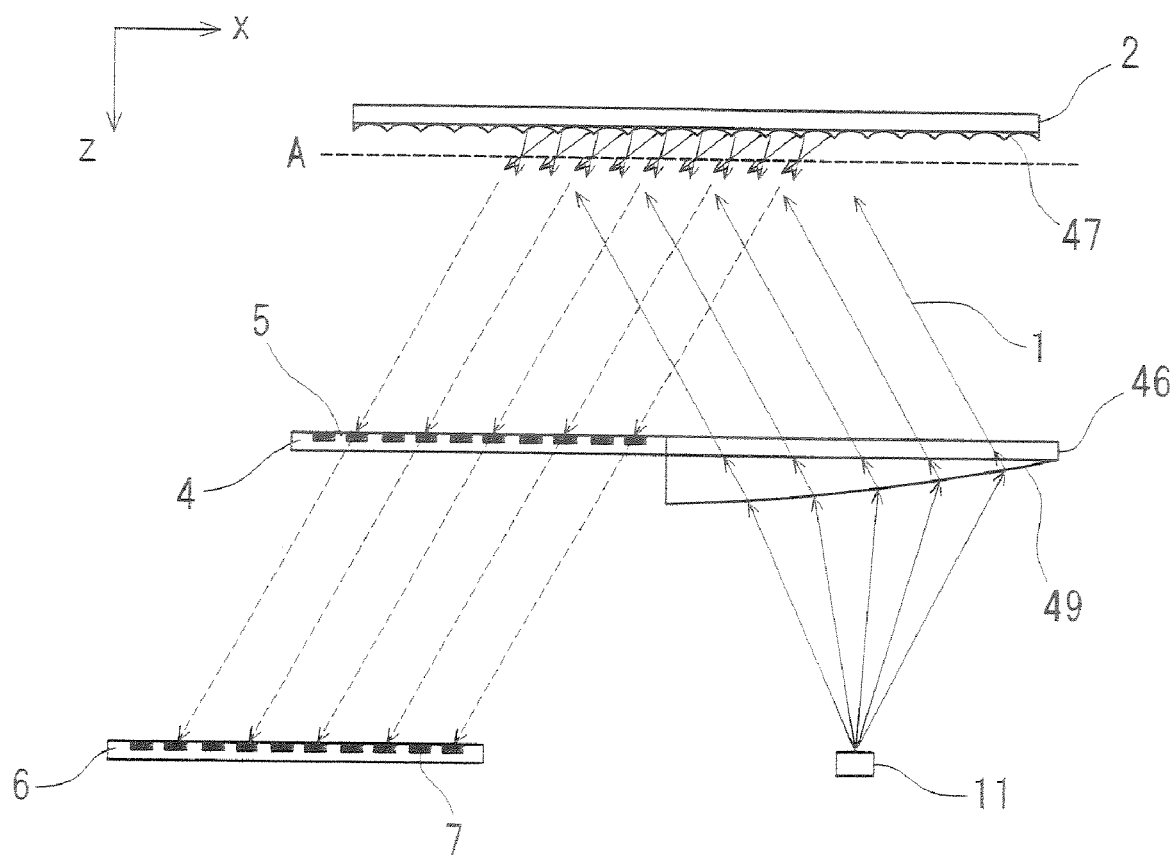
FIG. 20 shows a front view of an optical encoder according to the twentieth embodiment of the present invention, illustrating a lens, a first scale plate, a second scale plate and a light-receiving element array-provided substrate.

FIG. 20 shows a front view of an optical encoder according to the twentieth embodiment, illustrating a first scale plate, a second scale plate and a light-receiving element array-provided substrate. In this embodiment, a reflection type scale is used for the first scale plate.

The optical encoder according to this embodiment operates like the optical encoder according to the eighteenth embodiment, however, is different therefrom in that a lens 49 which allows the light beams emitted from a light source 11 to travel substantially in parallel is provided on an optical window 46.

Light beams emitted from the light source 11 pass through the lens 49 and travel substantially in parallel. In this regard, the outgoing optical axis of the light source 11 is intentionally shifted from the center axis of the lens 49, and therefore the substantially parallel light beams 1 travel to the left and upward on FIG. 20 and illuminate the cylindrical concave mirror array 47. Secondary light sources which are arrayed with substantially the same cycle as the arraying cycle of the cylindrical concave mirror array 47 and of which the light quantities generate a sine wavelike light quantity distribution are formed on the plane A on which the focusing positions of the respective concave mirrors are present.

Out of the sine wave-like light quantity distribution of the secondary light sources, only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves, and an output signal having a correlation to the relative movement of the two scale plates is obtained from the substrate 6.

In the optical encoder according to this embodiment almost all the light beams illuminating the first scale plate 2 are regularly reflected, except for some of the light beams which are absorbed to the cylindrical concave mirror array 47 or scattered therefrom, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution detection accuracy etc. can be improved.

Further, the lens 49 is formed integrally with the optical window 46, which makes it possible to form the light source and the lens portion with thinner thickness. Furthermore, the number of components can be decreased, which leads to a lower cost.

While the lens 49 is disposed on the optical window 46 on the side of the light source 11 in the embodiment shown in FIG. 20, the lens 49 may be disposed on the optical window on side of the first scale plate 2 (on the upper side on FIG. 20), and also in this case, a similar effect can be obtained.

In this embodiment, in place of the lens 49 consisting of a planoconvex lens, a Fresnel lens or a diffractive grating type lens, having the same function, may be used.

TWENTY-FIRST EMBODIMENT

FIG. 21 shows an optical encoder according to the twenty-first embodiment, illustrating a first scale plate, a second scale plate and a light-receiving element array-provided substrate, wherein FIG. 21(a) shows a front view thereof, and FIG. 21(b), a side view thereof. In this embodiment, a reflection type scale is used for a first scale plate.

The optical encoder according to the twenty-first embodiment has substantially the same arrangement as that of the eighteenth embodiment, however, is different in that substantially parallel light beams 1 shine on the first scale plate 2, inclining in the direction Y but not the direction X.

Like the eighteenth embodiment, secondary light sources whose light quantities generate a sine wave-like light quantity distribution are formed on a plane A on which the focusing positions of the respective concave mirrors of the cylindrical mirror array 47 are present. The light beams outgoing from the secondary light sources travel to the left and downward on FIG. 21(b) and pass through the second scale plate 4, incoming to the light-receiving element array-provided plate 6. In this regard, the focal lengths of the concave mirrors of the cylindrical mirror array 47, the angles of the traveling directions (indicated by the broken lines) of the reflected light beams from the cylindrical mirror array 47 and the positions of the second scale plate 4 and the substrate 6 on a plane XY are so selected that almost all the light beams illuminating the cylindrical concave mirror array 47 can travel to the substrate 6.

Out of the sine wave-like light quantity distribution of the secondary light sources, only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves, and an output signal having a correlation to the relative movement of the two scale plates is obtained from the substrate 6.

In the optical encoder according to this embodiment, almost all the light beams illuminating the first scale plate 2 are regularly reflected, except for some of the light beams which are absorbed to the cylindrical concave mirror array 47 or scattered therefrom, so that the quantity of light illuminating the substrate 6 can be increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution, detection accuracy, etc. can be improved.

The substantially parallel light beams 1 reach the first scale plate 2, inclining in the direction Y in the twenty-first embodiment, while the light beams 1 shine on the first scale plate 2, inclining in the direction X in the eighteenth embodiment. However, the scope of the present invention is not limited to these, and the light beams may be allowed to shine on the first scale plate 2, inclining in both the directions X and Y. In this case, it is needed that the positions of the second scale plate 4 and the substrate 6 should be so selected as to optimize the quantity of the light received by the substrate 6.

TWENTY-SECOND EMBODIMENT

Figure 22A:
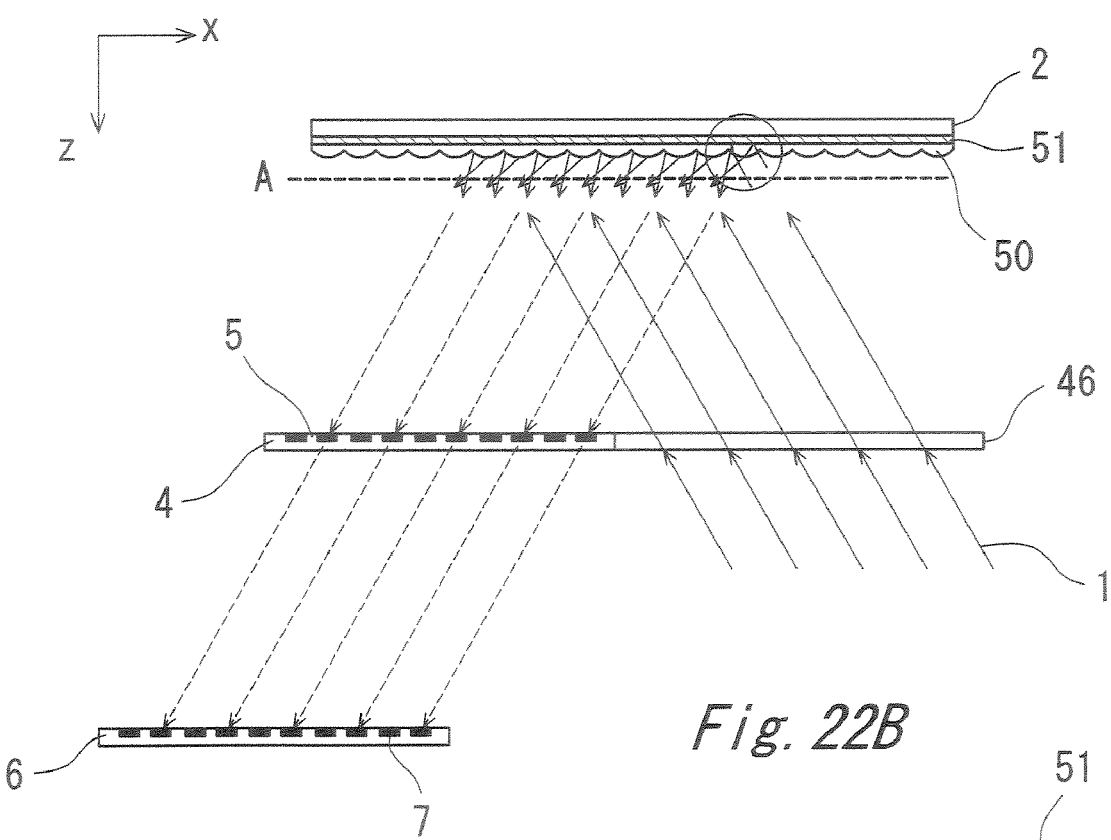
FIG. 22 shows a front view of an optical encoder according to the twenty-second embodiment of the present invention, illustrating a first scale plate a second scale plate and a light-receiving element array-provided substrate.
Figure 22B:
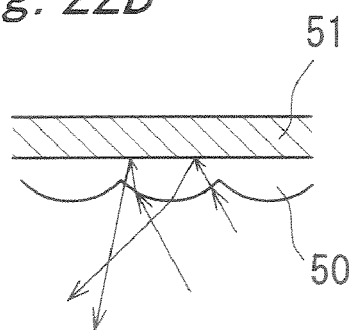

FIG. 22 shows an optical encoder according to the twenty-second embodiment of the present invention, illustrating a first scale plate, a second scale plate and a light-receiving element array-provided substrate, wherein FIG. 22(a), shows a front view thereof, and FIG. 22(b), an enlarged view of the vicinity of the first scale plate shown in FIG. 22(a). In this embodiment, a reflection type scale is used for the first scale plate.

In the optical encoder shown in FIG. 22, a cylindrical lens array 50 which converges light beams only in the direction X, and a reflector 51 are provided on a first scale plate 2. A second scale plate 4 is disposed on the light outgoing side of the first scale plate 2, and a light-receiving element array-provided substrate 6 is disposed on the side of a light traveling direction. Substantially parallel light beams 1 as incoming light shine through an optical window 46 provided on the second scale plate 4.

The substantially parallel light beams 1 pass through the optical window 46 and illuminate the cylindrical lens array 50. The light beams are reflected by the reflector 51 while being converged by the respective cylindrical lenses of the cylindrical lens array, and are again converged by the cylindrical lenses, traveling to the second scale plate 4. Secondary light sources which are arrayed with substantially the same cycle as the arraying cycle of the cylindrical lens array 50 and of which the light quantity generate a sine wave-like light quantity distribution are formed on a plane A on which the lens focusing positions are present.

The light beams outgoing from the secondary light sources travel to the left and downward on FIG. 22(a), and pass through the second scale plate 4, incoming to the substrate 6. In this regard, the focal lengths of the lenses of the cylindrical lens array 50, and the angles of the traveling directions (indicated by the broken lines) of the reflected light beams from the cylindrical lens array 50 are so selected that almost all the light beams illuminating the cylindrical lens array 50 can travel to the substrate 6.

Out of the sine wave-like light quantity distribution of the secondary light sources, only the frequency components which the second scale plate 4 functioning as a spatial frequency filter transmits are formed as an image on the substrates 6. When the first scale plate 2 and the second scale plate 4 are moved relative to each other along the grating-arraying direction, the image on the substrate 6 also moves, and an output signal having a correlation to the relative movement of the two scale plates is obtained from the substrate 6.

In the optical encoder according to this embodiment, almost all the light beams illuminating the first scale plate 2 are allowed to the substrate 6, except for some of the light beams which are absorbed to the cylindrical lens array 50 and the reflector 51 or scattered therefrom, so that the quantity of light illuminating the substrate 6 can be further increased. Further, since the light beams are not diffused in a direction perpendicular to the scale pattern arraying direction, the light beams from the light source can be more efficiently transmitted to the light-receiving elements, and the quantity of detected light can be further increased. Accordingly, the characteristics of the optical encoder such as detection resolution, detection accuracy, etc. can be improved.

While the cylindrical refractive lenses are used for the cylindrical lens array 50 in this embodiment, a Fresnel lens array having a light-converging function only in the direction X or a transmission type diffraction optic array may be used instead.

TWENTY-THIRD EMBODIMENT

Figure 23:
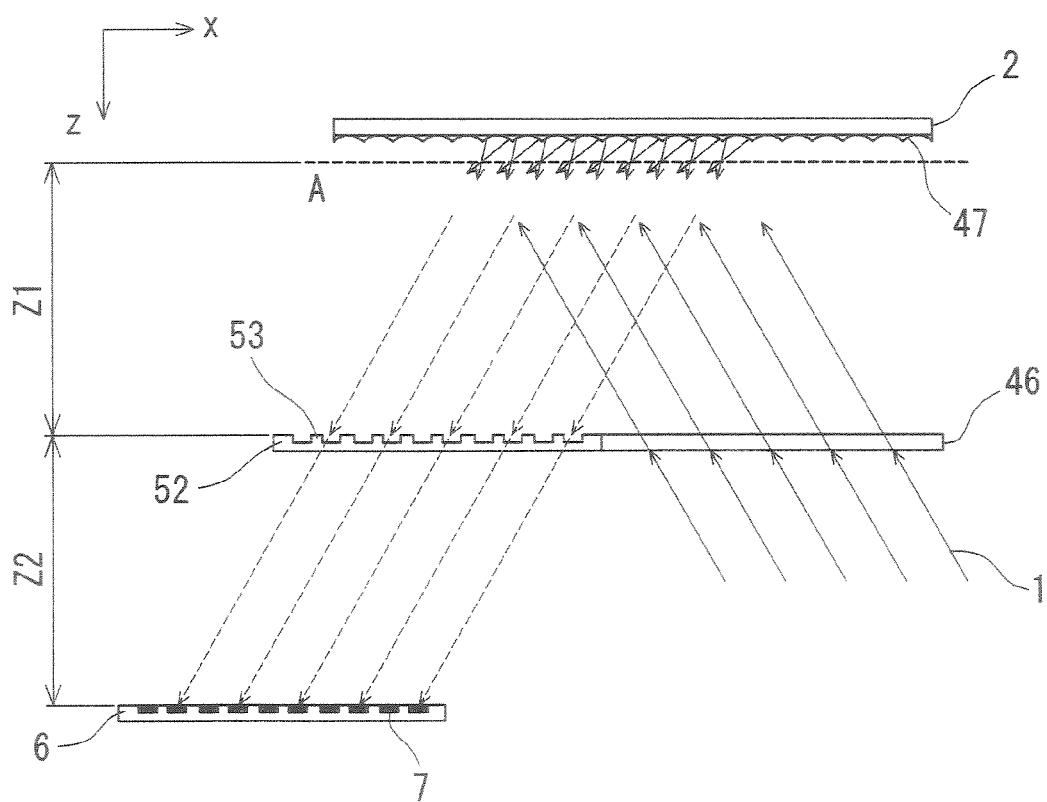
FIG. 23 shows a front view of an optical encoder according to the twenty-third embodiment of the present invention, illustrating a first scale plate, a second scale plate and a light-receiving element array-provided substrate.
Figure 24A:
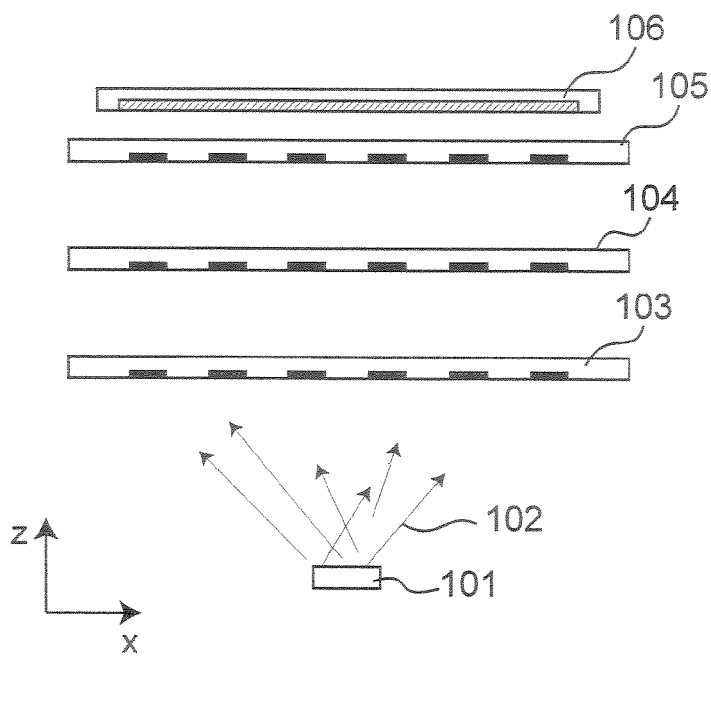
FIG. 24(a) is a front view of the optical encoder.
Figure 24B:
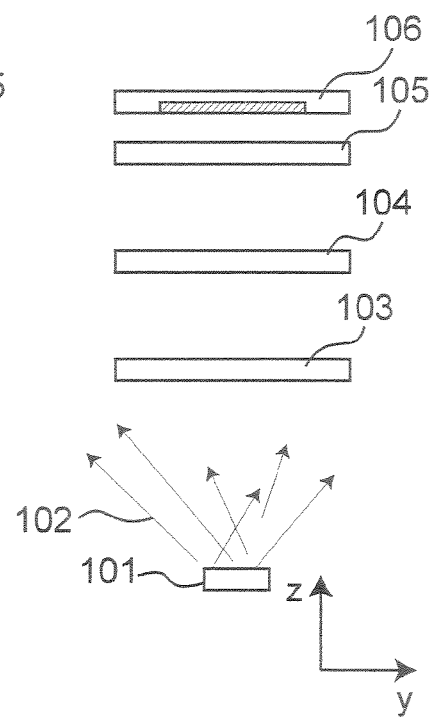
FIG. 24(b) is a side view thereof.

FIG. 23 shows a front view of an optical encoder according to the twenty-third embodiment of the present invention, illustrating a first scale plate, a second scale plate and a light-receiving element array-provided substrate. In this embodiment, a reflection type scale is used for the first scale plate.

The optical encoder according to this embodiment has substantially the same arrangement as that of the eighteenth embodiment, however, is different in that a phase grating 53 having a rectangular section, but not the amplitude grating is provided on a second scale plate 2. A phase grating, if its cycle, the step and the interval between each of scales are properly selected, can act as a spatial frequency filter having an optical transmission function (or OTF), like the amplitude grating. In case of this embodiment, the cycle of the phase grating 53 is p which is the same as the arraying cycle of the cylindrical concave mirror array 47 and the arraying cycle of the light-receiving elements 7 on the substrate 6. The step d of the phase grating is a value satisfying the following equation:

$$d=\lambda/2(n31\ 1).\qquad\text{[Equation 2]}$$

In this equation, $\lambda$ represents the wavelength of a light beams outgoing from a light source; and n represents the refractive index of the phase grating 53.

Further, the interval Z1 between the second scale plate 52 and the plane A on which the focusing positions of the respective concave mirrors of the cylindrical concave mirror array 47 are present is equal to one interval Z2 between the second scale plate 52 and the light-receiving element array-provided substrate 6, and each of Z1 and Z2 is a value described in the above equation 1.

Out of the sine wave-like light quantity distribution formed on the plane A on which the focusing positions of the cylindrical concave mirror array 47 are present, only the frequency components which the second scale plate 52 functioning as a spatial frequency filter transmits are formed as an image on the substrates 6. When the first scale plate 2 and the second scale plate 52 are moved relative to each other along the grating-arraying direction, the image on the substrate 6 also moves, and an output signal having a correlation to the relative movement of the two scale plates is obtained from the substrate 6.

In the optical encoder according to this embodiment, almost all the light beams illuminating the first scale plate 2 are regularly reflected, except for some of the light beams which are absorbed to the cylindrical concave mirror array 47 or scattered therefrom, so that the quantity of light illuminating the substrate 6 can be increased. Further, since the parallel light beams are not diffused in a direction perpendicular to the scale pattern arraying direction, the light beams from the light source can be more efficiently transmitted to the light-receiving elements, and the quantity of detected light can be further increase. Furthermore, since the phase grating 53, but not the amplitude grating having light-shielding portions, is provided on the second scale plate 52, almost all the light beams can be transmitted except for some light beams absorbed to the material or scattered therefrom, so that the quantity of detected light is increased. For example, it is expected that the optical encoder this embodiment can show a detected light quantity about 4 times larger than a detected light quantity obtained from an optical encoder in which amplitude gratings with duty ratios of 50% are provided on both of the first and second scale plates. Therefore, the optical encoder of this embodiment can be improved in characteristics such as detection resolution, detection accuracy, etc.

In this embodiment, the interval between the plane A and the second scale plate 52 is equal to the interval between the second scale plate 52 and the substrate 6; and the arraying cycle of the cylindrical concave mirror array 47, the cycle of the phase grating 53 and the arraying cycle of the light-receiving elements 7 on the substrate 6 are equal to one another. However, the scope of the present invention is not limited thereto, and all the conditions are allowed, so long as the light quantity distribution on the plane A can be formed as an image on the substrate 6.

While the rectangular phase grating having a rectangular section is used as the phase grating 53 in this embodiment, a sine wave phase grating having a sine wave-like section or the like may be used instead, so long as the light quantity distribution on the plane A can be formed as an image on the substrate 6.

The invention claimed is:

1. An optical encoder for measuring a relative movement of a first scale plate and a second scale plate, comprising
 a light source,
 a lens which converts light from the light source into substantially parallel light beams,
 a first scale plate provided with an optical element array which cyclically converges or diffuses the light beams outgoing from the light source through the lens, in a predetermined direction, and generates a cyclic light quantity distribution,
 a second scale plate which cyclically makes spatial modulation on the light beams from the first scale plate,
 a third scale plate having slits which allow the light beams from the second scale plate to pass therethrough, and
 a light-receiving element which receives the light beams from the third scale plate.

2. The optical encoder according to claim 1, wherein said optic array is a cylindrical lens array which converges or diffuses the light beams only in said cyclic direction.

3. The optical encoder according to claim 1, wherein said optic array is a cylindrical mirror array which converges or diffuses the light beams only in said cyclic direction.

4. The optical encoder according to claim 1, wherein said optic array is provided on the light incoming side of the first scale plate, and a diffuser which diffuses the light beams in said cyclic direction is provided on the opposite side of the first scale plate.

5. The optical encoder according to claim 4, wherein the light-diffusing angle of the diffuser changes according to a position in said cyclic direction.

6. The optical encoder according to claim 4, wherein the light-diffusing direction of the diffuser changes according to a position in said cyclic direction.

7. The optical encoder according to claim 1, wherein a prism which refracts the light beams only in one direction is provided on the opposite side of the surface of the first scale plate on which said optic array is provided.

8. The optical encoder according to claim 7, wherein said optic array is provided on the light incoming side of the first scale plate, and a prism array which refracts the light beams in said cyclic direction and of which the refracting direction changes according to a position in said cyclic direction is provided on the opposite side of the first scale plate.

9. The optical encoder according to claim 1, wherein said lens which converts light from the light source into substantially parallel light beams is provided on the light incoming side of the first scale plate, and said optic array is provided on the opposite side of the first scale plate.

10. An optical encoder for measuring relative movement of a first scale plate and a second scale plate comprising
 a light source,
 a cylindrical lens which converges light from the light source only in a direction perpendicular to a predetermined cyclic direction and converts it into parallel light beams,
 a first scale plate which converts the light beams emitted from the light source through the cylindrical lens, into a cyclic light quantity distribution in said cyclic direction,
 a second scale plate which cyclically makes spatial modulation on the light beams from the first scale,
 a third scale plate having slits which allow the light beams from the second scale plate to pass therethrough, and
 a light-receiving element which receives the light beams from the third scale plate.

11. An optical encoder for measuring a relative movement of a first scale plate and a second scale plate, comprising
 a light source,
 a lens which convert light from the light source into substantially parallel light beams,
 a first scale plate provided with an amplitude grating which convert the light beams emitted from the light source through the lens, into a cyclic light quantity distribution, and an optic which diffuses or refracts the light beams only in one direction,
 a second scale plate which cyclically makes spatial modulation on the light beams from the first scale,
 a third scale plate having slits which allow the light beams from the second scale plate to pass therethrough, and
 a light-receiving element which receives the light beams from the third scale plate.

12. The optical encoder according to claim 11, wherein said optic is a diffuser which diffuses the light beams only in said cyclic direction.

13. The optical encoder according to claim 12, wherein the diffusing angle of the diffuser changes according to a position in said cyclic direction.

14. The optical encoder according to claim 12, wherein the diffusing direction of the diffuser changes according to a position in said cyclic direction.

15. The optical encoder according to claim 12, wherein said diffuser is provided on the light outgoing side of the first scale plate, and a cylindrical lens which converges the light beams only in said cyclic direction is provided on the opposite side of the first scale plate.

16. The optical encoder according to claim 11, wherein said optic is a prism which refracts the light beams only in one direction.

* * * * *